(12) United States Patent
Tomioka

(10) Patent No.: US 10,295,807 B2
(45) Date of Patent: May 21, 2019

(54) ZOOM LENS AND IMAGING APPARATUS

(71) Applicant: FUJIFILM Corporation, Tokyo (JP)

(72) Inventor: Ukyo Tomioka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 72 days.

(21) Appl. No.: 15/433,331

(22) Filed: Feb. 15, 2017

(65) Prior Publication Data

US 2017/0276915 A1    Sep. 28, 2017

(30) Foreign Application Priority Data

Mar. 25, 2016 (JP) .................. 2016-061108

(51) Int. Cl.
*G02B 15/173* (2006.01)
*G02B 7/09* (2006.01)
*H04N 7/18* (2006.01)

(52) U.S. Cl.
CPC ............ *G02B 15/173* (2013.01); *G02B 7/09* (2013.01); *H04N 7/183* (2013.01)

(58) Field of Classification Search
CPC .... G02B 15/173; G02B 15/167; G02B 15/24; G02B 15/28; G02B 15/177; G02B 7/09; H04N 7/183
USPC ................. 359/686–687, 689, 690
See application file for complete search history.

(56) References Cited

U.S. PATENT DOCUMENTS

| | | | | |
|---|---|---|---|---|
| 5,059,007 A | * | 10/1991 | Tanaka ................ | G02B 15/173 359/676 |
| 2010/0214667 A1 | * | 8/2010 | Hayakawa .......... | G02B 15/173 359/683 |
| 2013/0342907 A1 | * | 12/2013 | Take .................... | G02B 15/173 359/557 |

FOREIGN PATENT DOCUMENTS

| | | |
|---|---|---|
| JP | S62-100722 A | 5/1987 |
| JP | H02-244110 A | 9/1990 |
| JP | 2003-262780 A | 9/2003 |
| JP | 2006-039005 A | 2/2006 |

* cited by examiner

*Primary Examiner* — Marin Pichler

(74) *Attorney, Agent, or Firm* — Studebaker & Brackett PC

(57) ABSTRACT

The zoom lens includes, in order from an object side, a positive first lens group G1, a negative second lens group G2, a positive third lens group G3, a diaphragm, and a fourth lens group G4. During zooming, only the second lens group G2 and the third lens group G3 move. The first lens group G1 includes, in order from the object side, a cemented lens that is formed by cementing a positive lens and a negative meniscus lens convex toward the object side, a positive lens, and a negative lens. A conditional expression (1): $-0.8 < f1a/f1b < 0$ is satisfied, where f1a is a composite focal length of the first to third lenses from the object side of the first lens group G1, and f1b is a focal length of the fourth lens.

20 Claims, 23 Drawing Sheets

EXAMPLE 1

EXAMPLE 1

EXAMPLE 2

EXAMPLE 3

EXAMPL 4

EXAMPLE 5

EXAMPLE 6

EXAMPLE 7

EXAMPLE 8

EXAMPLE 10

EXAMPLE 11

EXAMPLE 11

ZOOM LENS AND IMAGING APPARATUS

CROSS-REFERENCE TO RELATED APPLICATIONS

The present application claims priority under 35 U.S.C. § 119 to Japanese Patent Application No. 2016-061108, filed on Mar. 25, 2016. Each of the above application(s) is hereby expressly incorporated by reference, in its entirety, into the present application.

BACKGROUND OF THE INVENTION

1. Field of the Invention

The present invention relates to a zoom lens and an imaging apparatus. In particular, the present invention relates to a zoom lens, which is appropriate for a long-distance surveillance camera, and an imaging apparatus comprising the zoom lens.

2. Description of the Related Art

In the past, surveillance cameras have been used for crime prevention, recording, and the like, and the number of installed cameras has increased in recent years. As a lens system for surveillance cameras, a zoom lens is preferably used in situations where high versatility is required. As described in the following JP2006-39005A, conventionally known zoom lenses include, for example, a lens system comprising four lens groups of the first to fourth lens groups arranged in order from the object side, where the first lens group is formed of three lenses. Examples of zoom lenses having other four-group configurations include those described in the following JP2003-262780A, JP1987-100722A (JP-S62-100722A), and JP1990-244110 (JP-H2-244110A).

SUMMARY OF THE INVENTION

In recent years, there has been an increase in demand for long-distance surveillance cameras in many applications, and thus a zoom lens with a high zoom ratio, which can be used for such surveillance cameras, has been required. Since there is also a demand for higher image quality of images with the above demand, lens systems are also required to have high performance.

However, although the lens system described in JP2006-39005A has a high zoom ratio, there is room for improvement in correction of spherical aberration and longitudinal chromatic aberration at the telephoto end, in order to sufficiently cope with the recent demand for higher image quality. In the lens systems described in JP2003-262780A, JP1987-100722A (JP-S62-100722A), and JP1990-244110 (JP-H2-244110A), the zoom ratio is insufficient.

The present invention has been made in consideration of the above-mentioned situation, and its object is to provide a zoom lens, which is capable of satisfactorily correcting spherical aberration and longitudinal chromatic aberration at the telephoto end with a high zoom ratio and has optical high performance, and an imaging apparatus which comprises the zoom lens.

A zoom lens of the present invention consists of, in order from an object side: a first lens group that has a positive refractive power; a second lens group that has a negative refractive power; a third lens group that has a positive refractive power; a diaphragm; and a fourth lens group. During zooming, the first lens group and the fourth lens group remain stationary with respect to an image plane, and the second lens group and the third lens group move so as to have a different relative spacing therebetween in an optical axis direction. The first lens group consists of, in order from the object side, a cemented lens that is formed by cementing a first lens, which has a negative refractive power and has a meniscus shape convex toward the object side, and a second lens which has a positive refractive power, a third lens that has a positive refractive power, and a fourth lens that has a negative refractive power. With such a configuration, the following conditional expression (1) is satisfied.

$$-0.8 < f1a/f1b < 0 \qquad (1)$$

Here, f1a is a composite focal length of the first lens, the second lens, and the third lens, and f1b is a focal length of the fourth lens.

It is preferable that the zoom lens of the present invention satisfies at least one of the following conditional expressions (2) to (7) and (1-1) to (7-1).

$$-0.01 < \theta gF2 - \theta gF1 < 0.015 \qquad (2)$$

$$5 < \nu d2 - \nu d1 < 40 \qquad (3)$$

$$2.5 < fT/f1 < 4.5 \qquad (4)$$

$$-50 < fT/f2 < -10 \qquad (5)$$

$$5 < fT/f3 < 30 \qquad (6)$$

$$-15 < fT/f4 < 3 \qquad (7)$$

$$-0.7 < f1a/f1b < -0.2 \qquad (1\text{-}1)$$

$$-0.008 < \theta gF2 - \theta gF1 < 0.01 \qquad (2\text{-}1)$$

$$7 < \nu d2 - \nu d1 < 35 \qquad (3\text{-}1)$$

$$2.8 < fT/f1 < 4 \qquad (4\text{-}1)$$

$$-40 < fT/f2 < -20 \qquad (5\text{-}1)$$

$$7 < fT/f3 < 25 \qquad (6\text{-}1)$$

$$-12 < fT/f4 < 2 \qquad (7\text{-}1)$$

Here, $\theta gF1$ is a partial dispersion ratio of the first lens between the g line and the F line, $\theta gF2$ is a partial dispersion ratio of the second lens between the g line and the F line, $\nu d1$ is an Abbe number of the first lens on the basis of a d-line, $\nu d2$ is an Abbe number of the second lens on the basis of the d-line, fT is a focal length of the whole system at the telephoto end, f1 is a focal length of the first lens group, f2 is a focal length of the second lens group, f3 is a focal length of the third lens group, f4 is a focal length of the fourth lens group, f1a is a composite focal length of the first lens, the second lens, and the third lens, and f1b is a focal length of the fourth lens.

In the zoom lens of the present invention, it is preferable that during zooming from a wide-angle end to a telephoto end, a spacing between the third lens group and the fourth lens group constantly increases, and the second lens group and the third lens group simultaneously pass through a point at which respective lateral magnifications thereof are −1 times.

In the zoom lens of the present invention, the fourth lens group may have a negative refractive power, or the fourth lens group may have a positive refractive power.

In the zoom lens of the present invention, focusing may be performed by moving the entire first lens group.

An imaging apparatus of the present invention comprises the zoom lens of the present invention.

It should be noted that the term "includes, substantially ~" means that the imaging lens may include not only the above-mentioned elements but also lenses substantially having no powers, optical elements, which are not lenses, such as a diaphragm, and/or a cover glass, and mechanism parts such as a lens flange, a lens barrel, and/or a hand shaking correction mechanism.

It should be noted that the term "~lens group that has a positive refractive power" means that the lens group has a positive refractive power as a whole. It is the same for the term "~lens group that has a negative refractive power". Reference signs of refractive powers of the lens groups, reference signs of refractive powers of the lenses, and surface shapes of the lenses are assumed as those in paraxial regions in a case where some lenses have aspheric surfaces. The "lens group" is not necessarily formed of a plurality of lenses, but may be formed as only a single lens.

It should be noted that values of the conditional expressions (1), (3) to (7), (1-1), (3-1) to (7-1) are based on the d-line (a wavelength of 587.6 nm), in a state where an infinite object is in focus.

It should be noted that the partial dispersion ratio $\theta gF$ of a certain lens between the g line and the F line is defined as $\theta gF=(Ng-NF)/(NF-NC)$ when the refractive indexes of the lens at the g-line (a wavelength of 435.8 nm), the F-line (a wavelength of 486.1 nm), and the C-line (a wavelength of 656.3 nm) are respectively referred to as Ng, NF, and NC.

According to the present invention, the lens system includes, in order from the object side, the positive first lens group, the negative second lens group, the positive third lens group, a diaphragm, and a fourth lens group. During zooming, only the second lens group and the third lens group move. By setting a specific configuration of the first lens group, the zoom lens is configured to satisfy predetermined conditional expressions. Thus, it is possible to provide a zoom lens, which is capable of satisfactorily correcting spherical aberration and longitudinal chromatic aberration at the telephoto end with a high zoom ratio and has high optical performance, and an imaging apparatus which comprises the zoom lens.

DESCRIPTION OF THE PREFERRED EMBODIMENTS

Figure 1:
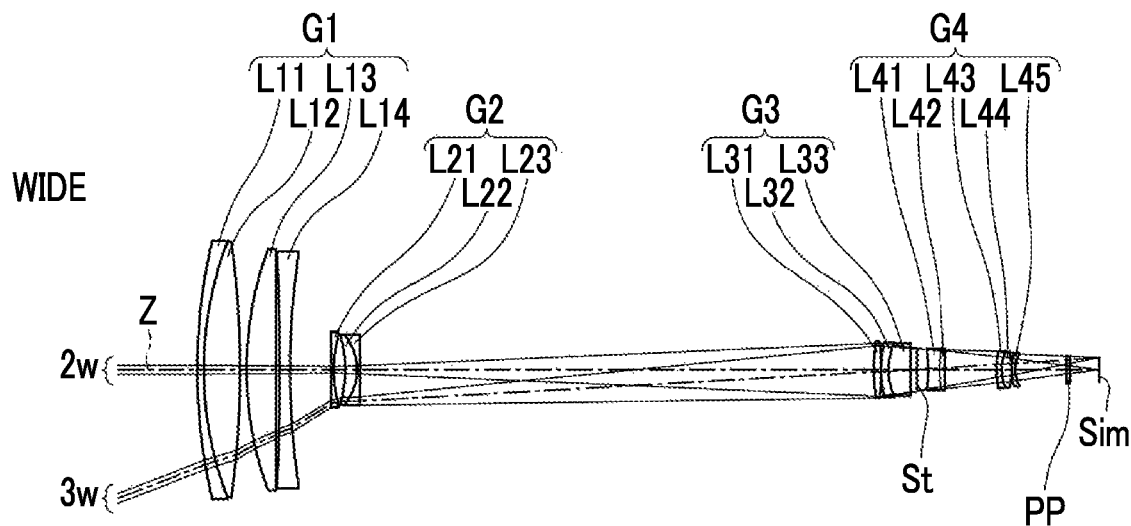
FIG. 1 is a cross-sectional view illustrating a configuration and an optical path of a zoom lens of Example 1 of the present invention.
Figure 1:
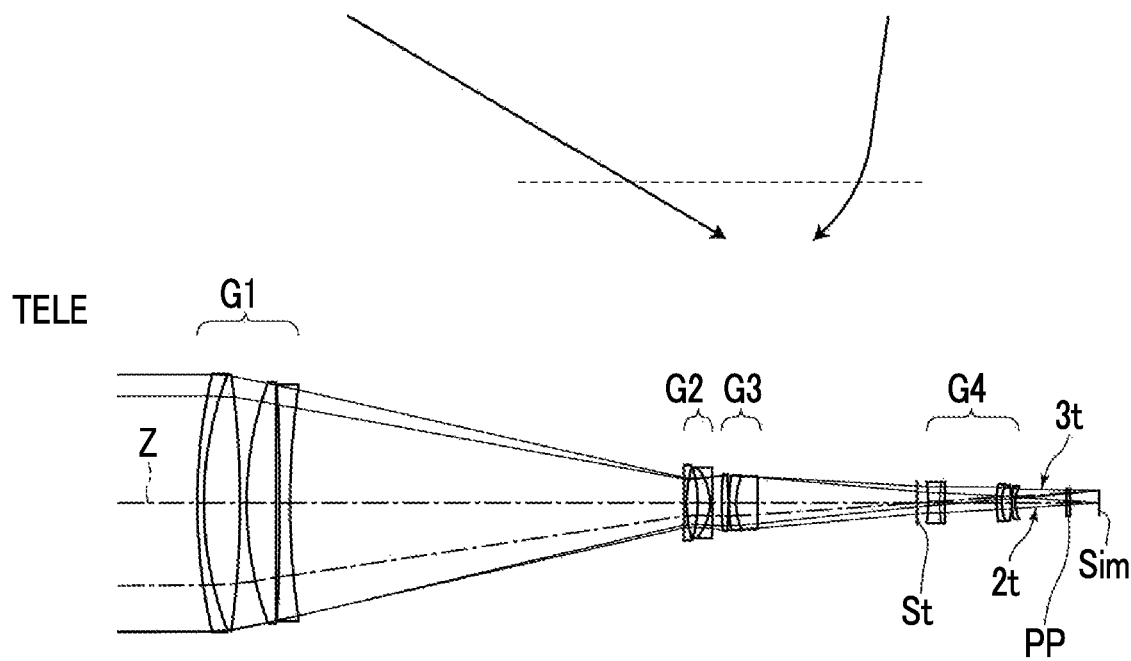

Hereinafter, embodiments of the present invention will be described with reference to drawings. FIGS. 1 to 11 are cross-sectional views illustrating configurations of zoom lenses according to an embodiment of the present invention, and respectively correspond to Examples 1 to 11 to be described later. FIGS. 1 to 11 show situations where an infinite object is in focus, where the left side thereof is the object side and the right side thereof is the image side, and a wide-angle end state is shown at the top thereof indicated by WIDE and a telephoto end state is shown at the bottom indicated by TELE. Further, in FIG. 1, the on-axis rays $2w$ at the wide-angle end, the off-axis rays $3w$ with the maximum angle of view, the on-axis rays $2t$ at the telephoto end, and the off-axis rays $3t$ with the maximum angle of view are shown together. Basic configurations and methods shown in the drawings of examples shown in FIGS. 1 to 11 are the same, and will be hereinafter described with reference to mainly the example shown in FIG. 1.

The zoom lens consists of, in order from the object side to the image side along the optical axis Z, a first lens group G1 that has a positive refractive power, a second lens group G2 that has a negative refractive power, a third lens group G3 that has a positive refractive power, an aperture diaphragm St, and a fourth lens group G4.

It should be noted that the aperture diaphragm St shown in FIG. 1 does not necessarily indicate its size and shape, and indicates a position of the diaphragm on the optical axis Z. Further, FIG. 1 shows an example in which an optical member PP having a plane parallel plate shape is disposed between the lens system and the image plane Sim. The optical member PP is assumed to be an infrared cut filter, a low pass filter, various other filters, a cover glass, and/or the like. In the present invention, the optical member PP may be disposed at a position different from that in the example of FIG. 1, or the optical member PP may be omitted.

In this zoom lens, during zooming, the first lens group G1 and the fourth lens group G4 remain stationary with respect to the image plane Sim, and the second lens group G2 and the third lens group G3 move so as to have a different relative spacing therebetween in the optical axis direction. In FIG. 1, the schematic movement loci of the second lens group G2 and the third lens group G3 which move during zooming from the wide-angle end to the telephoto end are indicated by arrows between the upper end and the lower end.

As described above, in the present embodiment, a zooming method, in which two movable lens groups during zooming have refractive powers having mutually different signs, is adopted. Among the zooming methods of the zoom lens having the four group configuration with a high zoom ratio, there is a method different from this embodiment in that two movable lens groups during zooming each have a negative refractive power. However, in this method, each of the two movable lens groups has an effect of diverging on-axis rays, and thus the on-axis rays are bounced up as the zoom ratio becomes high. As a result, the fourth lens group closest to the image side is increased in size. Generally, a lens system with a high zoom ratio tends to be large. However, considering application to imaging apparatuses such as surveillance cameras which need to consider restriction of installation space, cost increase due to strengthening of installation strength caused by an increase in weight resulting from an increase in size, and influence of strong wind in outdoor use, it is preferable that an increase in size of the lens system is suppressed as much as possible while maintaining a high zoom ratio. As in the present embodiment, the zoom lens having a four group configuration comprises, in order from the object side, a movable lens group (corresponding to the second lens group G2) having a negative refractive power and a movable lens group (corresponding to the third lens group G3) having a positive refractive power. In the zoom lens, the on-axis rays, which are bounced up once through the movable lens group having the negative refractive power, are converged through the movable lens group having the positive refractive power. Therefore, the fourth lens group G4 is configured to suppress an increase in size, and is suitable for a high zoom ratio zoom lens that meets the market requirements.

It is preferable that, during zooming from the wide-angle end to the telephoto end, a spacing between the third lens group G3 and the fourth lens group G4 constantly increases, and the second lens group G2 and the third lens group G3 pass through a point at which respective lateral magnifications thereof are −1 times. With such a configuration, it is possible to obtain a solution that keeps a focal position stationary while constantly increasing the spacing between the third lens group G3 and fourth lens group G4 during zooming from the wide-angle end to the telephoto end, and it is possible to constantly increase an absolute value of lateral magnification of the third lens group G3. Hence, a zooming action can be shared by the second lens group G2 and the third lens group G3, and this configuration is advantageous in achieving a high zoom ratio. In FIG. 1, a position, at which the respective lateral magnifications of the second lens group G2 and the third lens group G3 are −1 times at the same time, is indicated by the horizontal dotted line in the drawing of the movement locus.

The first lens group G1 of the zoom lens consists of, in order from the object side, a cemented lens that is formed by cementing a first lens L11, which has a negative refractive power and has a meniscus shape convex toward the object side, and a second lens L12 which has a positive refractive power, a third lens L13 that has a positive refractive power, and a fourth lens L14 that has a negative refractive power.

By sharing the positive and negative refractive powers between two sets including a set of the first lens L11 and the second lens L12 and a set of the third lens L13 and the fourth lens L14, even in the high zoom ratio zoom lens, it is possible to correct both spherical aberration and longitudinal chromatic aberration at the telephoto end. By cementing the first lens L11 and the second lens L12, it is possible to decrease an absolute value of a radius of curvature of the cemented surface, and it becomes advantageous in correcting chromatic aberration. Further, by forming the first lens L11 as a meniscus lens, it is possible to decrease the absolute value of the radius of curvature of the cemented surface. Therefore, it becomes easy to set the positive refractive power of the second lens L12 in an appropriate range, and it is possible to satisfactorily correct spherical aberration.

The zoom lens is configured to satisfy the following conditional expression (1).

$$-0.8 < f1a/f1b < 0 \tag{1}$$

Here, f1a is a composite focal length of the first lens, the second lens, and the third lens, and f1b is a focal length of the fourth lens.

By setting a ratio of the composite refractive power of the first to third lenses L11 to L13 and the refractive power of the fourth lens L14 in a range of the conditional expression (1), it is possible to appropriately correct spherical aberration at the telephoto end.

In order to enhance the effect of the conditional expression (1), it is preferable that the following conditional expression (1-1) is satisfied and the following conditional expression (1-2) is satisfied.

$$-0.7 < f1a/f1b < -0.2 \tag{1-1}$$

$$-0.6 < f1a/f1b < -0.3 \tag{1-2}$$

Further, it is preferable that the zoom lens satisfies the following conditional expression (2).

$$-0.01 < \theta gF2 - \theta gF1 < 0.015 \tag{2}$$

Here, θgF1 is a partial dispersion ratio of the first lens between the g line and the F line, and θgF2 is a partial dispersion ratio of the second lens between the g line and the F line.

By setting a difference between the partial dispersion ratios of the first lens L11 and the second lens L12 constituting the cemented lens of the first lens group G1 in a range of the conditional expression (2), it is possible to adjust on-axis 2nd order chromatic aberration occurring in the first lens L11 and the second lens L12 in an appropriate range, and it is possible to satisfactorily correct 1st order and 2nd order longitudinal chromatic aberrations at the telephoto end.

In order to enhance the effect of the conditional expression (2), it is more preferable that the following conditional expression (2-1) is satisfied, and it is yet more preferable that the following conditional expression (2-2) is satisfied.

$$-0.008<\theta gF2-\theta gF1<0.01 \quad (2-1)$$

$$0<\theta gF2-\theta gF1<0.009 \quad (2-2)$$

Further, it is preferable that the zoom lens satisfies the following conditional expression (3).

$$5<vd2-vd1<40 \quad (3)$$

Here, vd1 is an Abbe number of the first lens on the basis of a d-line, and vd2 is an Abbe number of the second lens on the basis of the d-line.

By not allowing the result of the conditional expression (3) to be equal to or less than the lower limit, it is possible to correct 1st order chromatic aberration without decreasing the absolute value of the radius of curvature of the cemented surface between the first lens L11 and the second lens L12. If the 1st order chromatic aberration is intended to be corrected without setting the difference between the Abbe number of the first lens L11 and the Abbe number of the second lens L12 in the appropriate range, it is necessary to reduce the absolute value of the radius of curvature of the cemented surface. This causes an increase in high order spherical aberration. By not allowing the result of the conditional expression (3) to be equal to or greater than the upper limit, it is possible to satisfactorily correct aberrations while suppressing an increase in 2nd order chromatic aberration through combination of presently existing optical materials. If the zoom lens is intended to be formed through combination of the presently existing optical materials in a case where the result of the conditional expression (3) is equal to or greater than the upper limit, the difference between the partial dispersion ratio of the first lens L11 and the partial dispersion ratio of the second lens L12 increases, and this causes an increase in 2nd order chromatic aberration.

In order to enhance the effect of the conditional expression (3), it is more preferable that the following conditional expression (3-1) is satisfied, and it is yet more preferable that the following conditional expression (3-2) is satisfied.

$$7<vd2-vd1<35 \quad (3-1)$$

$$10<vd2-vd1<25 \quad (3-2)$$

Further, it is preferable that the zoom lens satisfies at least one of the following conditional expressions (4) to (7).

$$2.5<fT/f1<4.5 \quad (4)$$

$$-50<fT/f2<-10 \quad (5)$$

$$5<fT/f3<30 \quad (6)$$

$$-15<fT/f4<3 \quad (7)$$

Here, fT is a focal length of the whole system at the telephoto end, f1 is a focal length of the first lens group,
f2 is a focal length of the second lens group,
f3 is a focal length of the third lens group, and
f4 is a focal length of the fourth lens group.

By not allowing the result of the conditional expression (4) to be equal to or less than the lower limit, this is advantageous in reducing a total length thereof. By not allowing the result of the conditional expression (4) to be equal to or greater than the upper limit, this is advantageous in reducing spherical aberration at the telephoto end. In order to enhance the effect relating to the conditional expression (4), it is more preferable that the following conditional expression (4-1) is satisfied.

$$2.8<fT/f1<4 \quad (4-1)$$

By not allowing the result of the conditional expression (5) to be equal to or less than the lower limit, the refractive power of the second lens group G2 can be set not to become excessively strong, and thus it is possible to suppress fluctuation in spherical aberration and distortion during zooming. By not allowing the result of the conditional expression (5) to be equal to or greater than the upper limit, this is advantageous in suppressing an amount of movement of the second lens group G2 during zooming and reducing the total length. In order to enhance the effect relating to the conditional expression (5), it is more preferable that the following conditional expression (5-1) is satisfied.

$$-40<fT/f2<-20 \quad (5-1)$$

By not allowing the result of the conditional expression (6) to be equal to or less than the lower limit, this is advantageous in suppressing an amount of movement of the third lens group G3 during zooming and reducing the total length. By not allowing the result of the conditional expression (6) to be equal to or greater than the upper limit, the positive refractive power of the third lens group G3 can be set not to become excessively strong, and thus it is possible to suppress fluctuation in spherical aberration during zooming. In order to enhance the effect relating to the conditional expression (6), it is more preferable that the following conditional expression (6-1) is satisfied.

$$7<fT/f3<25 \quad (6-1)$$

By not allowing the result of the conditional expression (7) to be equal to or less than the lower limit, it is possible to prevent the positive refractive power of the third lens group G3 from becoming excessively large. As a result, this is advantageous in suppressing spherical aberration. By not allowing the result of the conditional expression (7) to be equal to or greater than the upper limit, it is possible to prevent the positive refractive power of the fourth lens group G4 from becoming excessively strong. As a result, this is advantageous in suppressing mostly spherical aberration at the wide-angle end.

In order to enhance the effect of the conditional expression (7), it is more preferable that the following conditional expression (7-1) is satisfied, and it is yet more preferable that the following conditional expression (7-2) is satisfied.

$$-12<fT/f4<2 \quad (7-1)$$

$$-10<fT/f4<0 \quad (7-2)$$

It should be noted that the zoom lens may be configured to perform focusing by moving the entire first lens group G1. In such a case, in the entire zooming range from the wide-angle end to the telephoto end, it is possible to set the same amount of extension of the first lens group G1 during focusing at an arbitrary subject distance regardless of zoom ratios. As a result, it is possible to perform focusing with easy control.

For example, the first lens group G1 may include, in order from the object side: a cemented lens that is formed by cementing a negative meniscus lens convex toward the object side and a biconvex lens in order from the object side; a positive lens that is convex toward the object side; and a biconcave lens.

The second lens group G2 may be formed of, for example, three or four lenses. The third lens group G3 may be formed of, for example, two or more and four or less lenses. The fourth lens group G4 may be formed of, for example, three or more and five or less lenses.

The fourth lens group G4 may be formed to have a negative refractive power. In such a case, it is possible to satisfactorily correct mostly spherical aberration occurring in the range from the first lens group G1 to the third lens group G3 at the wide-angle end. Alternatively, the fourth lens group G4 may be formed to have a positive refractive power. In such a case, it becomes easy to ensure a back focal length thereof, and it becomes easy to reduce the number of lenses constituting the fourth lens group G4.

For example, the fourth lens group G4 may include, in order from the object side: a negative meniscus lens that is concave toward the object side; a positive lens; and a negative meniscus lens that is concave toward the image side, where the negative meniscus lens closest to the object side and the positive lens immediately after the image side thereof within the fourth lens group G4 are disposed with a longest air spacing interposed therebetween in the fourth lens group G4. With such a configuration, the number of lenses can be set to be small, and it is possible to ensure the back focal length while balancing spherical aberration and longitudinal chromatic aberration with two lenses on the object side. Further, by forming a long air spacing, it is possible to balance astigmatism while suppressing an effect on spherical aberration with the negative meniscus lens closest to the image side at which the height of the on-axis marginal ray increases and the height of the off-axis principal ray decreases. The fourth lens group G4 of each example of FIGS. 2, 6, 7, and 11 has the above-mentioned configuration.

Alternatively, the fourth lens group G4 may include, in order from the object side: a first cemented lens in which a biconcave lens and a positive lens are cemented; a second cemented lens in which a negative meniscus lens concave toward the image side and a biconvex lens are cemented; and a negative meniscus lens that is concave toward the image side, where the first cemented lens and the second cemented lens are disposed with a longest air spacing interposed therebetween in the fourth lens group G4. With such a configuration, it is possible to balance axial chromatic aberration and lateral chromatic aberration by arranging two sets of negative lenses and positive lenses away from each other. Further, it is possible to balance astigmatism while suppressing an effect on spherical aberration with the negative meniscus lens closest to the image side. The fourth lens group G4 of each example of FIGS. 1 and 5 has the above-mentioned configuration.

Alternatively, the fourth lens group G4 may include, in order from the object side: a first cemented lens in which a negative lens and a positive lens are cemented; a positive lens as a single lens; and a second cemented lens in which a negative meniscus lens concave toward the image side and a biconvex lens are cemented, where the positive lens as a single lens and the second cemented lens are disposed with a longest air spacing interposed therebetween in the fourth lens group G4. With such a configuration, it is possible to balance axial chromatic aberration and lateral chromatic aberration by arranging two sets of negative lenses and positive lenses away from each other. Further, the positive lens is disposed between the first cemented lens and the second cemented lens, whereby it is possible to balance spherical aberration. The fourth lens group G4 of the example of FIG. 4 has the above-mentioned configuration.

Alternatively, the fourth lens group G4 may include, in order from the object side: a negative lens; a positive lens; and a cemented lens in which a negative meniscus lens concave toward the image side and a positive lens are cemented, where a cemented lens and a positive lens immediately before the object side thereof are disposed with a longest air spacing interposed therebetween in the fourth lens group G4. With such a configuration, it is possible to balance axial chromatic aberration and lateral chromatic aberration by arranging two sets of negative lenses and positive lenses away from each other. The fourth lens group G4 of each example of FIGS. 3, 8, 9, and 10 has the above-mentioned configuration.

The above-mentioned preferred configurations and available configurations may be arbitrary combinations, and it is preferable to selectively adopt the configurations in accordance with required specification. According to the present embodiment, it is possible to realize a zoom lens which is capable of satisfactorily correcting spherical aberration and longitudinal chromatic aberration at the telephoto end with a high zoom ratio and has optical high performance. It should be noted that the "high zoom ratio" described herein means that the zoom ratio is equal to or greater than 40 times.

Next, numerical examples of the zoom lens of the present invention will be described.

Example 1

A lens configuration of a zoom lens of Example 1 is shown in FIG. 1, and an illustration method thereof is as described above. Therefore, repeated description is omitted herein. Regarding a group configuration, the zoom lens of Example 1 includes, in order from the object side, a first lens group G1 that has a positive refractive power, a second lens group G2 that has a negative refractive power, a third lens group G3 that has a positive refractive power, an aperture diaphragm St, and a fourth lens group G4 that has a negative refractive power. During zooming from the wide-angle end to the telephoto end, the first lens group G1, the aperture diaphragm St, and the fourth lens group G4 remain stationary with respect to the image plane Sim, and the second lens group G2 and the third lens group G3 are moved by changing the relative spacing therebetween.

The first lens group G1 includes, in order from the object side, the first to fourth lenses L11 to L14. The second lens group G2 includes, in order from the object side, lenses L21 to L23. The third lens group G3 includes, in order from the object side, lenses L31 to L33. The fourth lens group G4 includes, in order from the object side, lenses L41 to L45.

Table 1 shows basic lens data of the zoom lens of Example 1, and Table 2 shows specification and variable surface spacings. In Table 1, the column of Si shows i-th (i=1, 2, 3, . . . ) surface number. The i-th surface number is attached to each of surfaces of the elements, where i sequentially increases toward the image side when a surface of an element closest to the object side is regarded as a first surface. The column of Ri shows a radius of curvature of the i-th surface. The column of Di shows a surface spacing on the optical axis Z between the i-th surface and an i+1 surface. In Table 1, the column of Ndj shows a refractive index of a j-th (j=1, 2, 3, . . . ) component at the d-line (a wavelength of 587.6 nm), where j sequentially increases toward the image side when the surface of the element closest to the object side is regarded as the first surface. The column of vdj shows an Abbe number of the j-th component on the basis of the d-line. The column of θgFj shows a partial dispersion ratio between the g-line (a wavelength of 435.8 nm) and the F-line (a wavelength of 486.1 nm) of the j-th component.

Here, reference signs of radii of curvature of surface shapes convex toward the object side are set to be positive, and reference signs of radii of curvature of surface shapes convex toward the image side are set to be negative. Table 1 additionally shows the aperture diaphragm St and the optical member PP. In Table 1, in a place of a surface number of a surface corresponding to the aperture diaphragm St, the surface number and a term of (St) are noted. A value at the bottom place of Di indicates a spacing between the image plane Sim and the surface closest to the image side in the table. In Table 1, the variable surface spacings, which are variable during zooming, are referenced by the reference signs DD[ ], and are written into places of Di, where object side surface numbers of spacings are noted in [ ].

Table 2 shows values of the zoom ratio Zr, the focal length f of the whole system, the F number FNo., the maximum total angle of view 2ω, and the variable surface spacing, on the basis of d-line. (o) in the place of 2ω indicates that the unit thereof is a degree. In Table 2, values at the wide-angle end, the middle focal length state, and the telephoto end are respectively shown in the columns labeled by WIDE, MIDDLE, and TELE. The values of Tables 1 and 2 are values in a state where the infinite object is in focus.

In data of each table, a degree is used as a unit of an angle, and mm is used as a unit of a length, but appropriate different units may be used since the optical system can be used even in a case where the system is enlarged or reduced in proportion. Further, the following each table describes numerical values rounded off to predetermined decimal places.

TABLE 1

Example 1

| Si | Ri | Di | Ndj | vdj | θgFj |
|---|---|---|---|---|---|
| 1 | 218.40568 | 2.500 | 1.48749 | 70.24 | 0.53007 |
| 2 | 133.94070 | 14.179 | 1.49700 | 81.54 | 0.53748 |
| 3 | −353.32521 | 2.565 | | | |
| 4 | 131.58845 | 11.363 | 1.49700 | 81.54 | 0.53748 |
| 5 | ∞ | 1.578 | | | |
| 6 | −949.58707 | 4.000 | 1.72047 | 34.71 | 0.58350 |
| 7 | 290.82300 | DD[7] | | | |
| 8 | −889.82530 | 1.000 | 2.00100 | 29.13 | 0.59952 |
| 9 | 48.58111 | 4.359 | | | |
| 10 | −48.06798 | 4.748 | 1.95906 | 17.47 | 0.65993 |
| 11 | −20.24539 | 1.020 | 1.91082 | 35.25 | 0.58224 |
| 12 | −403.09308 | DD[12] | | | |
| 13 | 77.91891 | 2.801 | 1.61800 | 63.33 | 0.54414 |
| 14 | −105.86057 | 0.100 | | | |
| 15 | 49.67823 | 2.773 | 1.90366 | 31.31 | 0.59481 |
| 16 | 24.67803 | 8.548 | 1.61800 | 63.33 | 0.54414 |
| 17 | 7683.24714 | DD[17] | | | |
| 18(St) | ∞ | 4.330 | | | |
| 19 | −48.45143 | 4.668 | 1.59551 | 39.24 | 0.58043 |
| 20 | 47.08892 | 2.099 | 1.90366 | 31.31 | 0.59481 |
| 21 | 527.35653 | 20.255 | | | |
| 22 | 35.45625 | 1.988 | 1.91082 | 35.25 | 0.58224 |
| 23 | 16.66460 | 3.863 | 1.54814 | 45.78 | 0.56859 |
| 24 | −37.41507 | 0.148 | | | |
| 25 | 25.82053 | 1.354 | 1.49700 | 81.54 | 0.53748 |
| 26 | 13.28647 | 20.000 | | | |
| 27 | ∞ | 1.500 | 1.51680 | 64.20 | 0.53430 |
| 28 | ∞ | 11.230 | | | |

TABLE 2

Example 1

| | WIDE | MIDDLE | TELE |
|---|---|---|---|
| Zr | 1.0 | 6.3 | 57.6 |
| f | 12.739 | 80.447 | 734.401 |
| FNo. | 3.89 | 4.69 | 7.50 |
| 2ω(°) | 40.8 | 6.6 | 0.8 |
| DD[7] | 16.154 | 114.214 | 153.602 |
| DD[12] | 200.492 | 86.788 | 3.456 |
| DD[17] | 2.648 | 18.293 | 62.237 |

Figure 12:
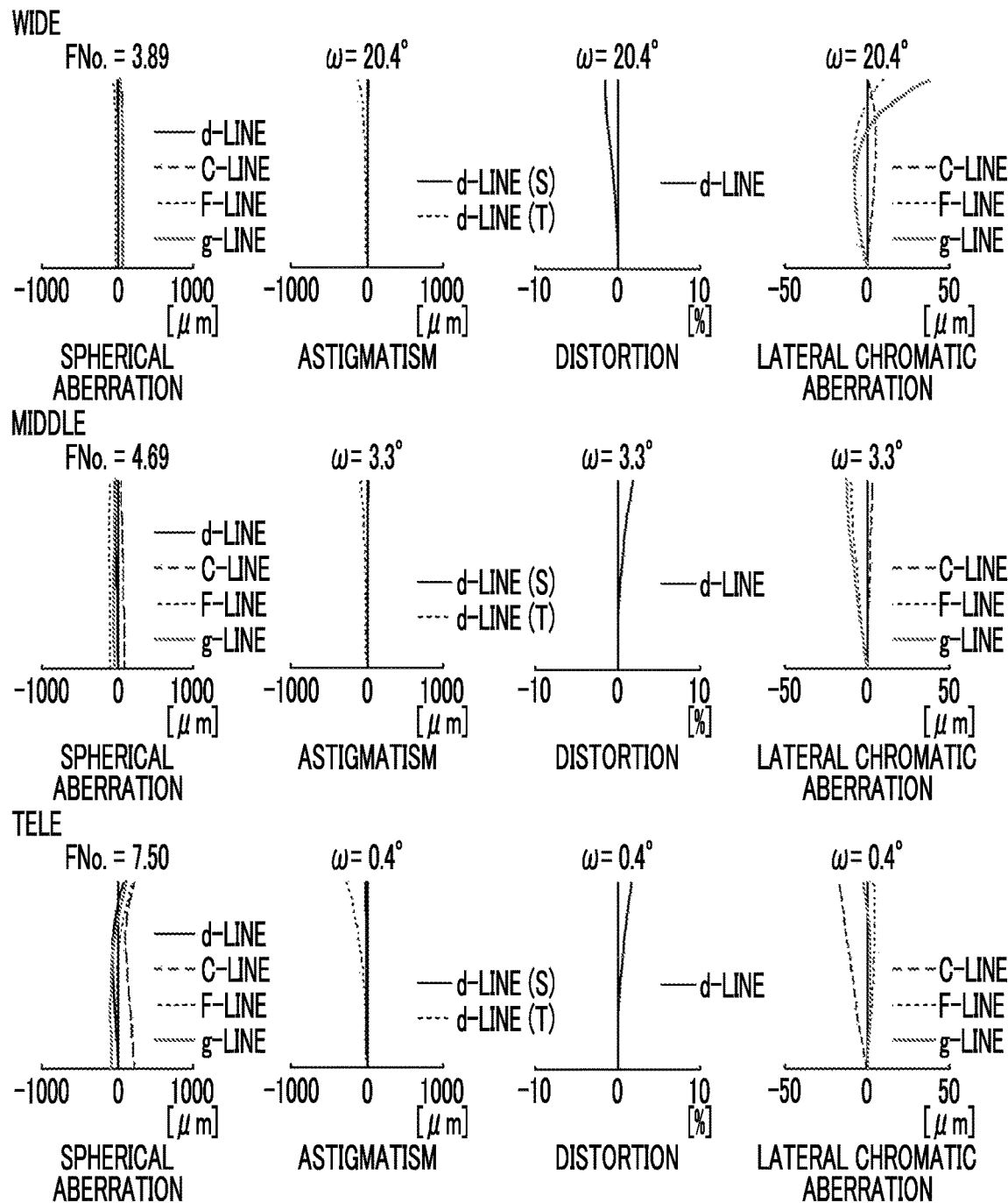
FIG. 12 is a diagram of aberrations of the zoom lens of Example 1 of the present invention.

FIG. 12 shows aberration diagrams in a state where an infinite distance object is brought into focus through the zoom lens of Example 1. FIG. 12 shows spherical aberration, astigmatism, distortion (distortion aberration), and lateral chromatic aberration (chromatic aberration of magnification) at the wide-angle end in order from the left top indicated by WIDE, shows spherical aberration, astigmatism, distortion, and lateral chromatic aberration at the middle focal length state in order from the left middle indicated by MIDDLE, and shows spherical aberration, astigmatism, distortion, and lateral chromatic aberration at the telephoto end in order from the left bottom indicated by TELE. In the spherical aberration diagram, aberrations at the d-line (a wavelength of 587.6 nm), the C-line (a wavelength of 656.3 nm), the F-line (a wavelength of 486.1 nm), and the g-line (a wavelength of 435.8 nm) are respectively indicated by the solid line, the long dashed line, the short dashed line, and the gray solid line. In the astigmatism diagram, aberration in the sagittal direction at the d-line is indicated by the solid line, and aberration in the tangential direction at the d-line is indicated by the short dashed line. In the distortion diagram, aberration at the d-line is indicated by the solid line. In the lateral chromatic aberration, aberrations at the C-line, the F-line, and the g-line are respectively indicated by the long dashed line, the short dashed line, and the gray solid line. In the spherical aberration diagram, FNo. indicates an F number. In the other aberration diagrams, ω indicates a half angle of view.

In the description of Example 1, reference signs, meanings, and description methods of the respective data pieces are the same as those in the following examples unless otherwise noted. Therefore, in the following description, repeated description will be omitted.

Example 2

Figure 2:
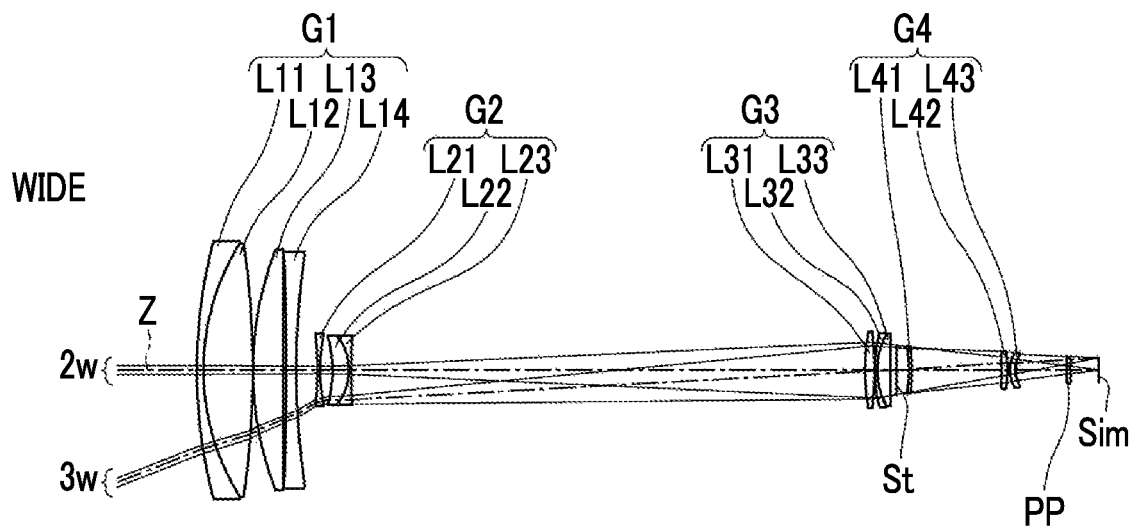
FIG. 2 is a cross-sectional view illustrating a configuration and an optical path of a zoom lens of Example 2 of the present invention.
Figure 2:
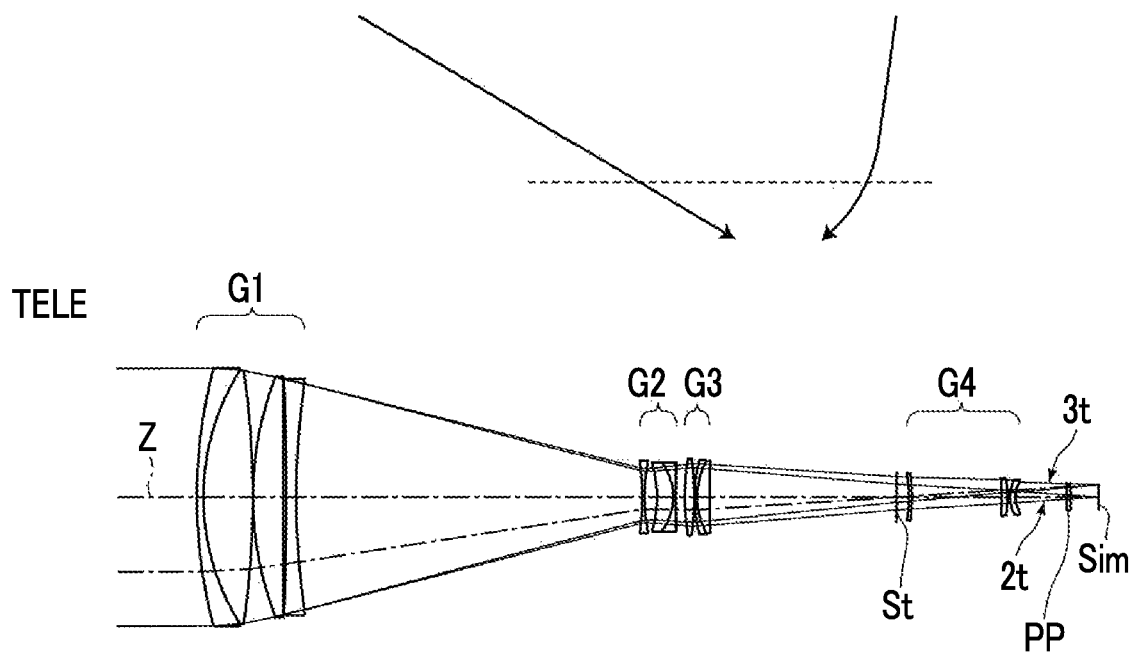
Figure 13:
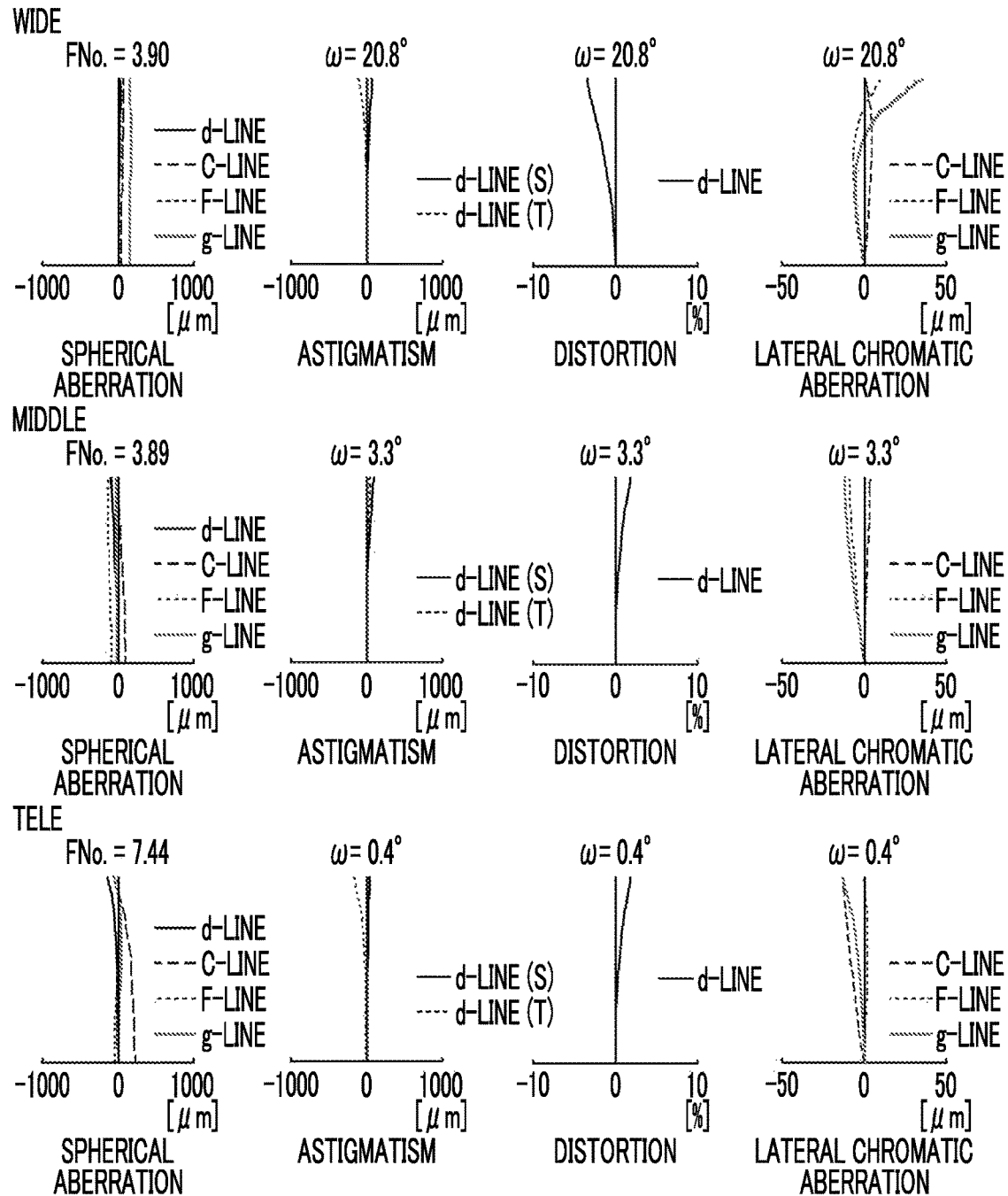
FIG. 13 is a diagram of aberrations of the zoom lens of Example 2 of the present invention.

FIG. 2 shows a lens configuration of the zoom lens of Example 2. The group configuration of the zoom lens of Example 2 is the same as that of Example 1. In Example 2, the first lens group G1 includes, in order from the object side, the first to fourth lenses L11 to L14. The second lens group G2 includes, in order from the object side, lenses L21 to L23. The third lens group G3 includes, in order from the object side, lenses L31 to L33. The fourth lens group G4 includes, in order from the object side, lenses L41 to L43. Table 3 shows basic lens data of the zoom lens of Example 2, Table 4 shows specification and variable surface spacings, and FIG. 13 shows aberration diagrams in a state where the infinite object is in focus.

TABLE 3

Example 2

| Si | Ri | Di | Ndj | vdj | θgFj |
|---|---|---|---|---|---|
| 1 | 191.96674 | 2.520 | 1.51680 | 64.20 | 0.53430 |
| 2 | 89.57810 | 19.306 | 1.49700 | 81.54 | 0.53748 |
| 3 | −334.49552 | 0.100 | | | |
| 4 | 124.91815 | 11.777 | 1.49700 | 81.54 | 0.53748 |
| 5 | ∞ | 1.186 | | | |
| 6 | −1114.04803 | 4.000 | 1.74950 | 35.28 | 0.58704 |
| 7 | 307.73374 | DD[7] | | | |
| 8 | −127.90411 | 1.000 | 2.00069 | 25.46 | 0.61364 |
| 9 | 64.96425 | 4.900 | | | |
| 10 | −46.51945 | 6.385 | 1.94595 | 17.98 | 0.65460 |
| 11 | −21.29165 | 1.020 | 1.78590 | 44.20 | 0.56317 |
| 12 | 440.99164 | DD[12] | | | |
| 13 | 89.62122 | 3.704 | 1.61800 | 63.33 | 0.54414 |
| 14 | −105.03844 | 0.100 | | | |
| 15 | 54.90015 | 1.000 | 1.90366 | 31.31 | 0.59481 |
| 16 | 28.23740 | 5.020 | 1.61800 | 63.33 | 0.54414 |
| 17 | 928.71657 | DD[17] | | | |
| 18(St) | ∞ | 4.719 | | | |
| 19 | −51.62990 | 1.095 | 1.51823 | 58.90 | 0.54567 |
| 20 | −103.58156 | 35.333 | | | |
| 21 | −195.58114 | 2.501 | 1.51823 | 58.90 | 0.54567 |
| 22 | −33.67121 | 0.993 | | | |
| 23 | 14.14366 | 2.048 | 1.80440 | 39.59 | 0.57297 |
| 24 | 10.99190 | 20.000 | | | |
| 25 | ∞ | 1.500 | 1.51680 | 64.20 | 0.53430 |
| 26 | ∞ | 11.011 | | | |

TABLE 4

Example 2

| | WIDE | MIDDLE | TELE |
|---|---|---|---|
| Zr | 1.0 | 6.3 | 57.6 |
| f | 12.753 | 80.533 | 735.192 |
| FNo. | 3.90 | 3.89 | 7.44 |
| 2ω(°) | 41.6 | 6.6 | 0.8 |
| DD[7] | 8.217 | 99.222 | 134.665 |
| DD[12] | 200.368 | 90.382 | 3.471 |
| DD[17] | 2.570 | 21.552 | 73.020 |

Example 3

Figure 3:
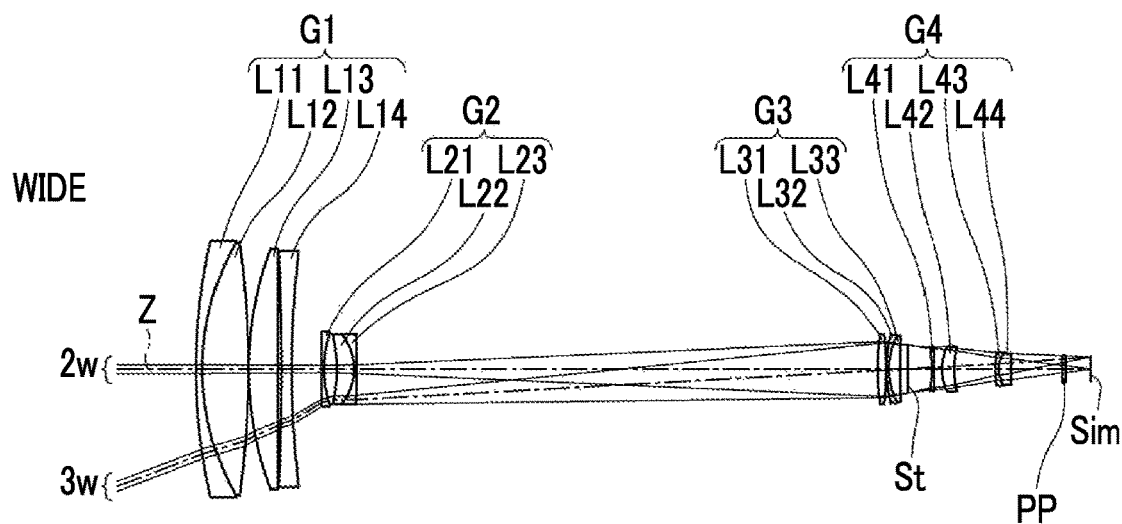
FIG. 3 is a cross-sectional view illustrating a configuration and an optical path of a zoom lens of Example 3 of the present invention.
Figure 3:
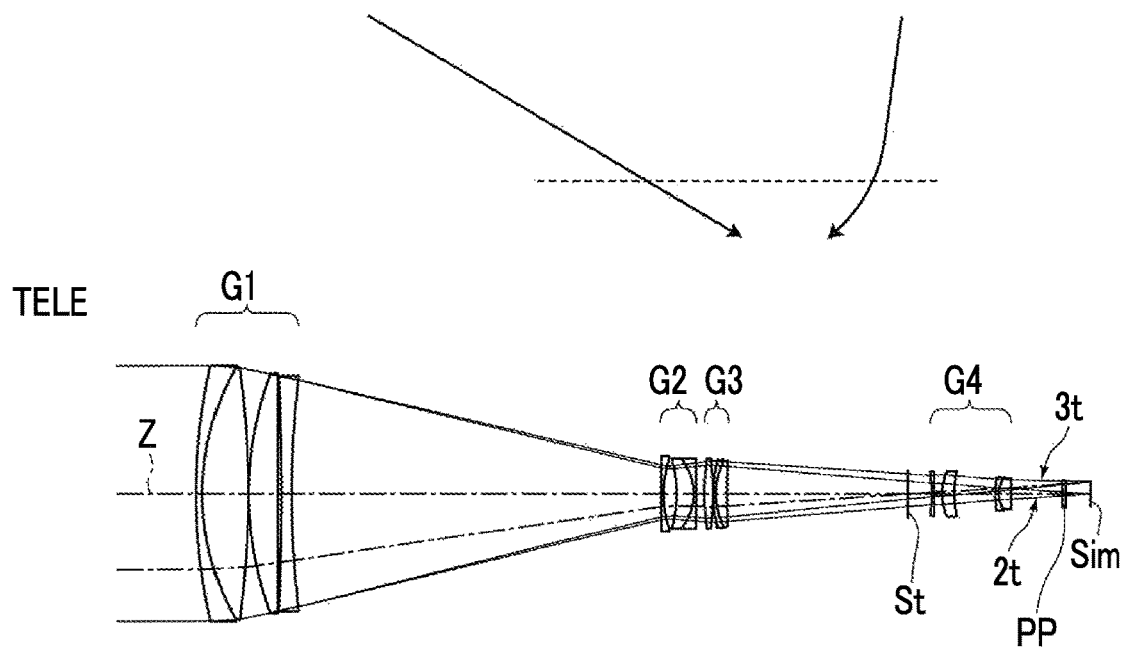
Figure 14:
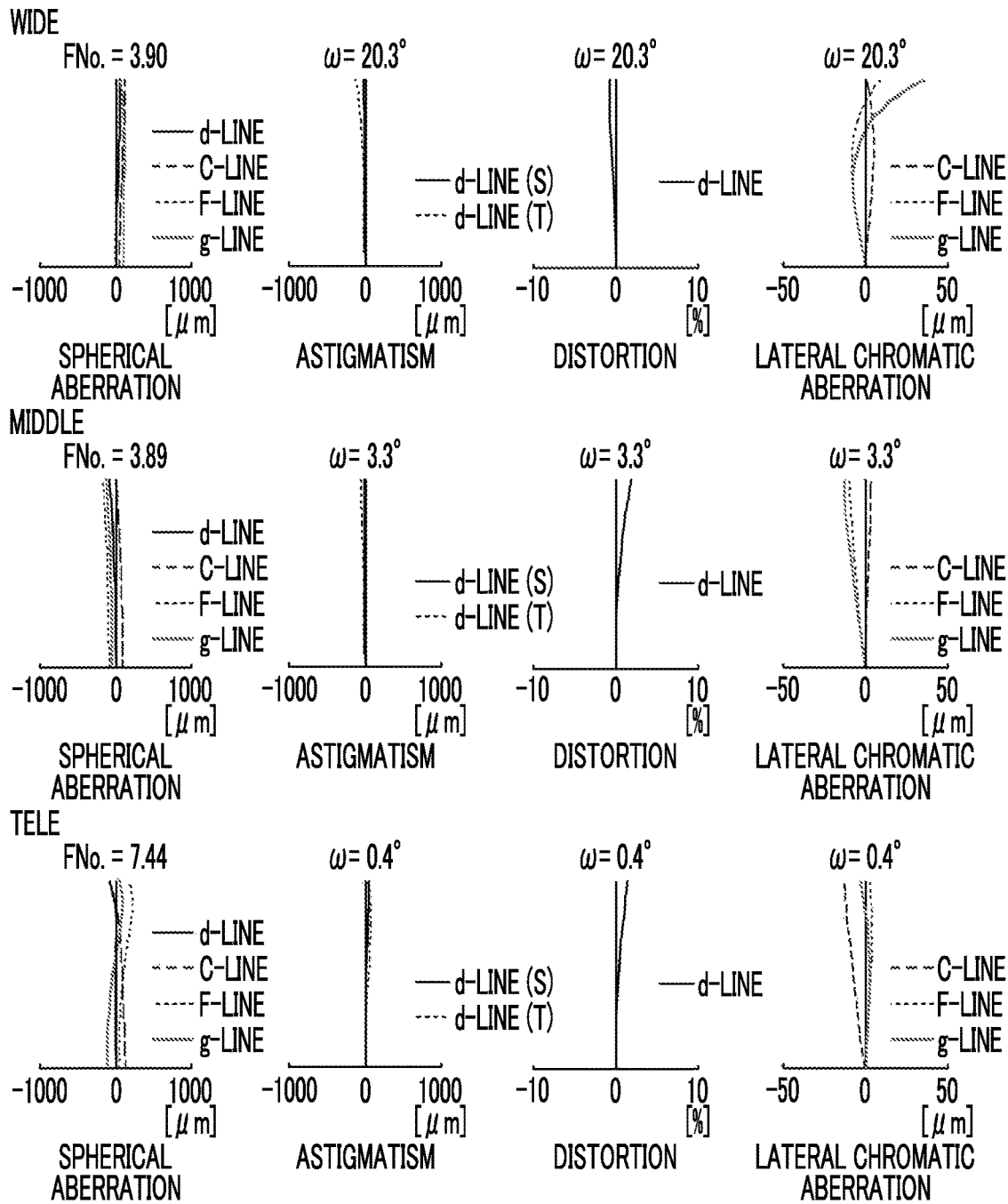
FIG. 14 is a diagram of aberrations of the zoom lens of Example 3 of the present invention.

FIG. 3 shows a lens configuration of the zoom lens of Example 3. The group configuration of the zoom lens of Example 3 is the same as that of Example 1. In Example 3, the first lens group G1 includes, in order from the object side, the first to fourth lenses L11 to L14. The second lens group G2 includes, in order from the object side, lenses L21 to L23. The third lens group G3 includes, in order from the object side, lenses L31 to L33. The fourth lens group G4 includes, in order from the object side, lenses L41 to L44. Table 5 shows basic lens data of the zoom lens of Example 3, Table 6 shows specification and variable surface spacings, and FIG. 14 shows aberration diagrams in a state where the infinite object is in focus.

TABLE 5

Example 3

| Si | Ri | Di | Ndj | vdj | θgFj |
|---|---|---|---|---|---|
| 1 | 215.84986 | 2.500 | 1.48749 | 70.24 | 0.53007 |
| 2 | 97.80300 | 17.883 | 1.49700 | 81.54 | 0.53748 |
| 3 | −349.91122 | 0.348 | | | |
| 4 | 130.09067 | 11.504 | 1.49700 | 81.54 | 0.53748 |

TABLE 5-continued

Example 3

| Si | Ri | Di | Ndj | vdj | θgFj |
|---|---|---|---|---|---|
| 5 | ∞ | 1.331 | | | |
| 6 | −994.32955 | 4.000 | 1.80100 | 34.97 | 0.58642 |
| 7 | 353.45348 | DD[7] | | | |
| 8 | 895.64822 | 1.000 | 2.00069 | 25.46 | 0.61364 |
| 9 | 42.17170 | 5.113 | | | |
| 10 | −52.08115 | 6.755 | 1.95906 | 17.47 | 0.65993 |
| 11 | −20.54709 | 1.020 | 1.91082 | 35.25 | 0.58224 |
| 12 | −433.61467 | DD[12] | | | |
| 13 | 84.79772 | 3.423 | 1.61800 | 63.33 | 0.54414 |
| 14 | −106.15374 | 0.100 | | | |
| 15 | 50.65722 | 1.000 | 1.90366 | 31.31 | 0.59481 |
| 16 | 27.03826 | 4.475 | 1.61800 | 63.33 | 0.54414 |
| 17 | 341.26564 | DD[17] | | | |
| 18(St) | ∞ | 9.070 | | | |
| 19 | −68.73274 | 1.000 | 1.90043 | 37.37 | 0.57720 |
| 20 | 365.91418 | 3.396 | | | |
| 21 | 21.00186 | 4.721 | 1.70154 | 41.24 | 0.57664 |
| 22 | 36.23985 | 16.127 | | | |
| 23 | 53.45602 | 1.402 | 1.90043 | 37.37 | 0.57720 |
| 24 | 10.19297 | 4.964 | 1.62004 | 36.26 | 0.58800 |
| 25 | −145.69180 | 20.000 | | | |
| 26 | ∞ | 1.500 | 1.51680 | 64.20 | 0.53430 |
| 27 | ∞ | 9.697 | | | |

TABLE 6

Example 3

| | WIDE | MIDDLE | TELE |
|---|---|---|---|
| Zr | 1.0 | 6.3 | 57.6 |
| f | 12.733 | 80.407 | 734.038 |
| FNo. | 3.90 | 3.89 | 7.44 |
| 2ω(°) | 40.6 | 6.6 | 0.8 |
| DD[7] | 11.744 | 107.770 | 145.586 |
| DD[12] | 205.339 | 91.057 | 3.146 |
| DD[17] | 3.015 | 21.271 | 71.366 |

Example 4

Figure 4:
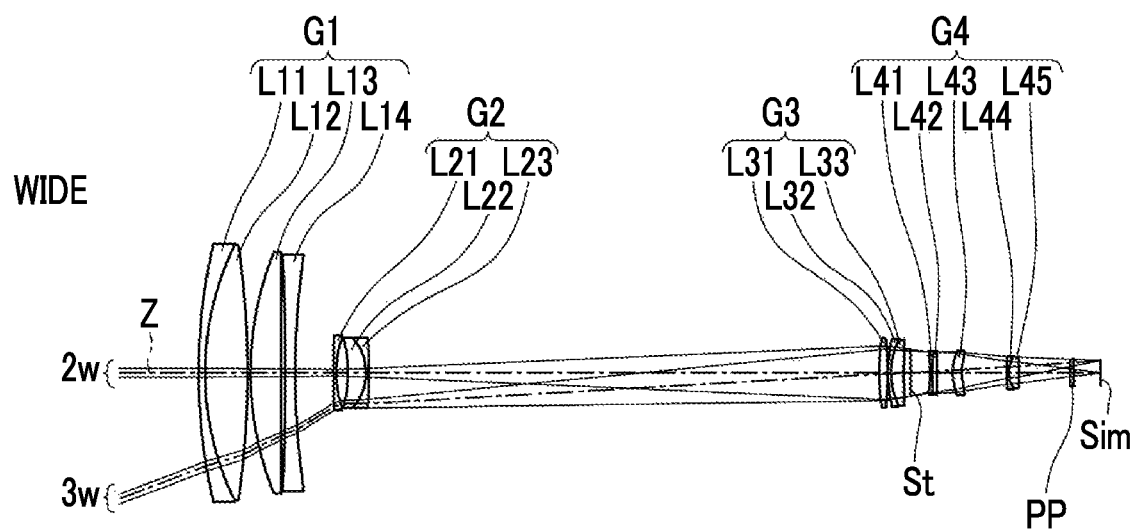
FIG. 4 is a cross-sectional view illustrating a configuration and an optical path of a zoom lens of Example 4 of the present invention.
Figure 4:
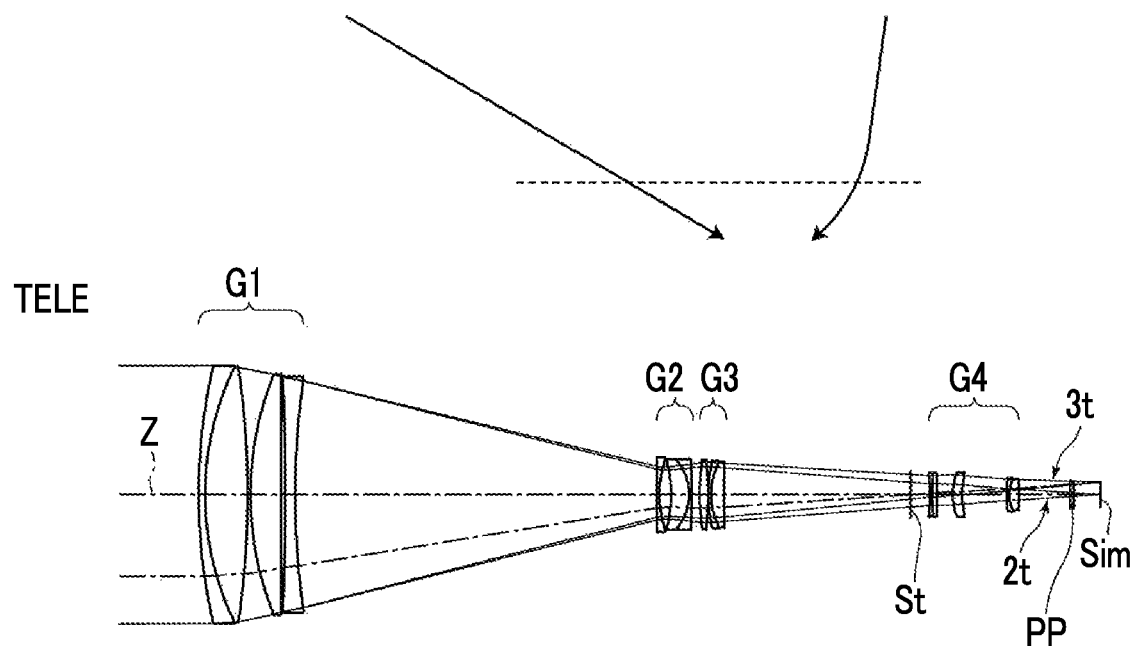
Figure 15:
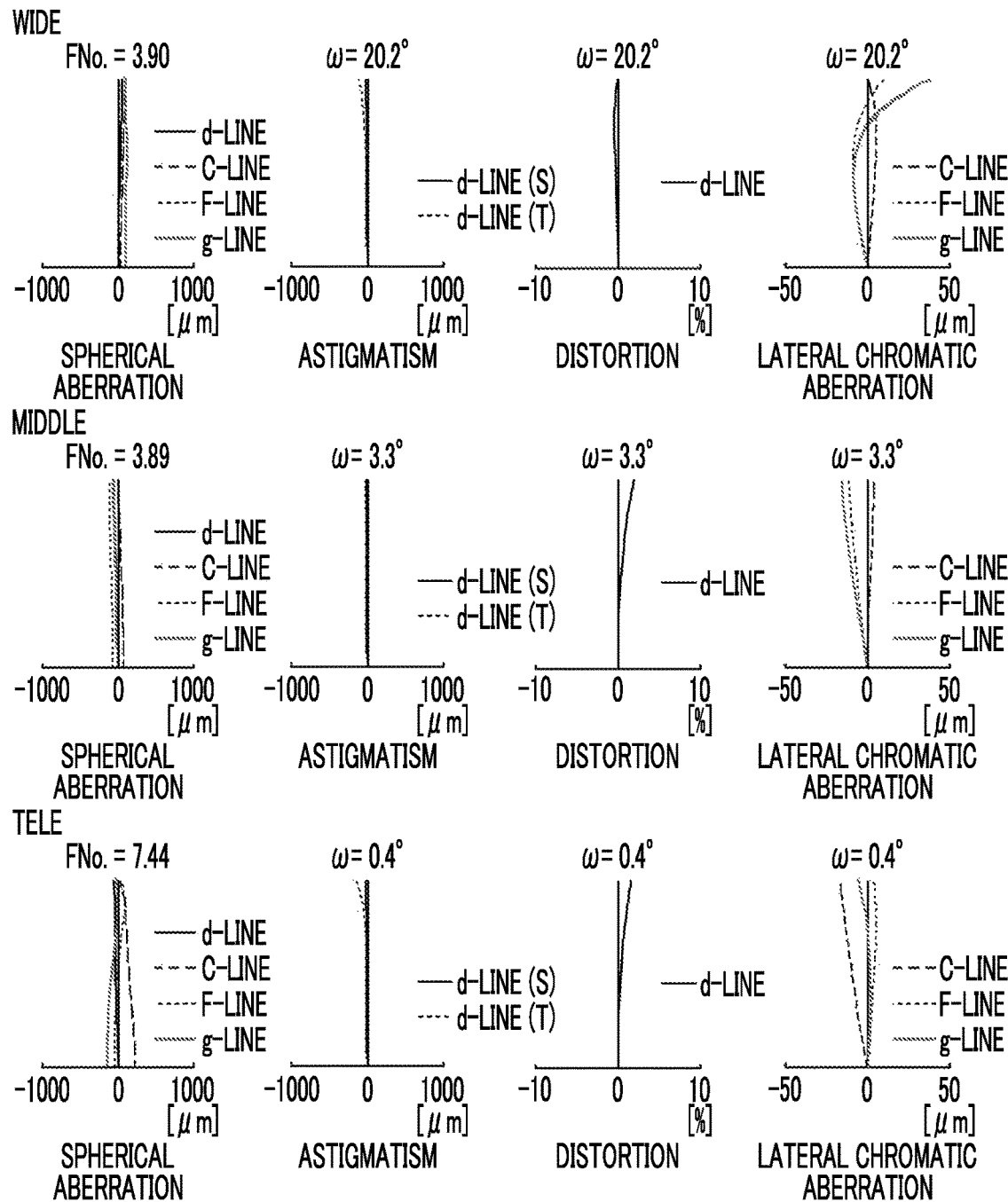
FIG. 15 is a diagram of aberrations of the zoom lens of Example 4 of the present invention.

FIG. 4 shows a lens configuration of the zoom lens of Example 4. The group configuration of the zoom lens of Example 4 is the same as that of Example 1. In Example 4, the first lens group G1 includes, in order from the object side, the first to fourth lenses L11 to L14. The second lens group G2 includes, in order from the object side, lenses L21 to L23. The third lens group G3 includes, in order from the object side, lenses L31 to L33. The fourth lens group G4 includes, in order from the object side, lenses L41 to L45. Table 7 shows basic lens data of the zoom lens of Example 4, Table 8 shows specification and variable surface spacings, and FIG. 15 shows aberration diagrams in a state where the infinite object is in focus.

TABLE 7

Example 4

| Si | Ri | Di | Ndj | vdj | θgFj |
|---|---|---|---|---|---|
| 1 | 217.13137 | 2.504 | 1.48749 | 70.24 | 0.53007 |
| 2 | 109.11879 | 16.601 | 1.49700 | 81.54 | 0.53748 |
| 3 | −334.71666 | 1.145 | | | |
| 4 | 121.49144 | 12.130 | 1.49700 | 81.54 | 0.53748 |
| 5 | ∞ | 1.394 | | | |
| 6 | −1084.38808 | 4.000 | 1.80100 | 34.97 | 0.58642 |
| 7 | 314.34496 | DD[7] | | | |

TABLE 7-continued

Example 4

| Si | Ri | Di | Ndj | vdj | θgFj |
|---|---|---|---|---|---|
| 8 | 2458.85221 | 1.000 | 2.00069 | 25.46 | 0.61364 |
| 9 | 41.40489 | 4.540 | | | |
| 10 | −50.01329 | 7.000 | 1.95906 | 17.47 | 0.65993 |
| 11 | −19.94426 | 1.020 | 1.91082 | 35.25 | 0.58224 |
| 12 | −377.31537 | DD[12] | | | |
| 13 | 82.68537 | 3.339 | 1.61800 | 63.33 | 0.54414 |
| 14 | −116.39447 | 0.100 | | | |
| 15 | 53.54060 | 1.163 | 1.90366 | 31.31 | 0.59481 |
| 16 | 27.63487 | 5.020 | 1.61800 | 63.33 | 0.54414 |
| 17 | 772.82848 | DD[17] | | | |
| 18(St) | ∞ | 7.492 | | | |
| 19 | −76.22060 | 1.000 | 1.89781 | 38.22 | 0.57276 |
| 20 | 121.26208 | 1.829 | 1.62155 | 61.30 | 0.54050 |
| 21 | −521.93034 | 6.406 | | | |
| 22 | 20.97422 | 3.698 | 1.67616 | 33.12 | 0.59129 |
| 23 | 33.20618 | 17.397 | | | |
| 24 | 54.26052 | 0.934 | 1.89226 | 38.77 | 0.57135 |
| 25 | 11.17162 | 3.896 | 1.58060 | 39.94 | 0.57671 |
| 26 | −82.11234 | 20.000 | | | |
| 27 | ∞ | 1.500 | 1.51680 | 64.20 | 0.53430 |
| 28 | ∞ | 10.288 | | | |

TABLE 8

Example 4

| | WIDE | MIDDLE | TELE |
|---|---|---|---|
| Zr | 1.0 | 6.3 | 57.6 |
| f | 12.742 | 80.467 | 734.584 |
| FNo. | 3.90 | 3.89 | 7.44 |
| 2ω(°) | 40.4 | 6.6 | 0.8 |
| DD[7] | 15.029 | 105.616 | 140.929 |
| DD[12] | 199.163 | 89.699 | 3.112 |
| DD[17] | 2.740 | 21.617 | 72.891 |

Example 5

Figure 5:
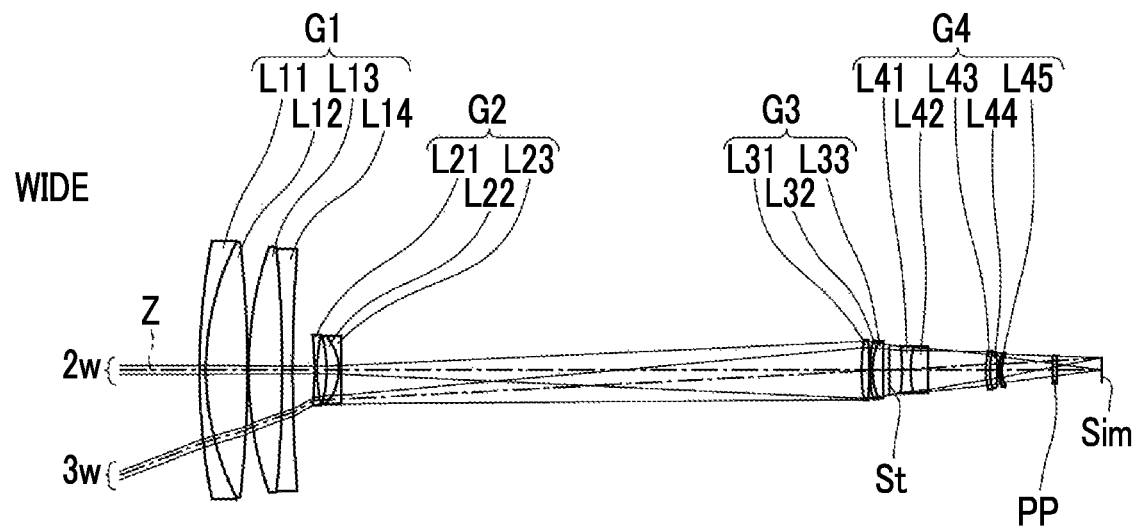
FIG. 5 is a cross-sectional view illustrating a configuration and an optical path of a zoom lens of Example 5 of the present invention.
Figure 5:
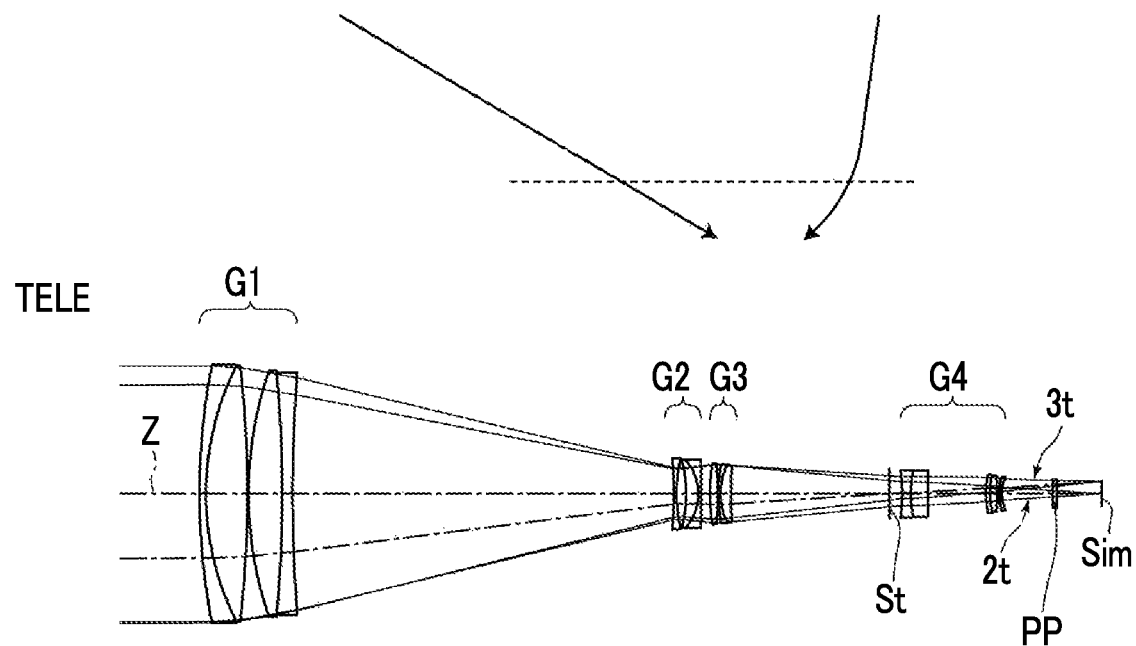
Figure 16:
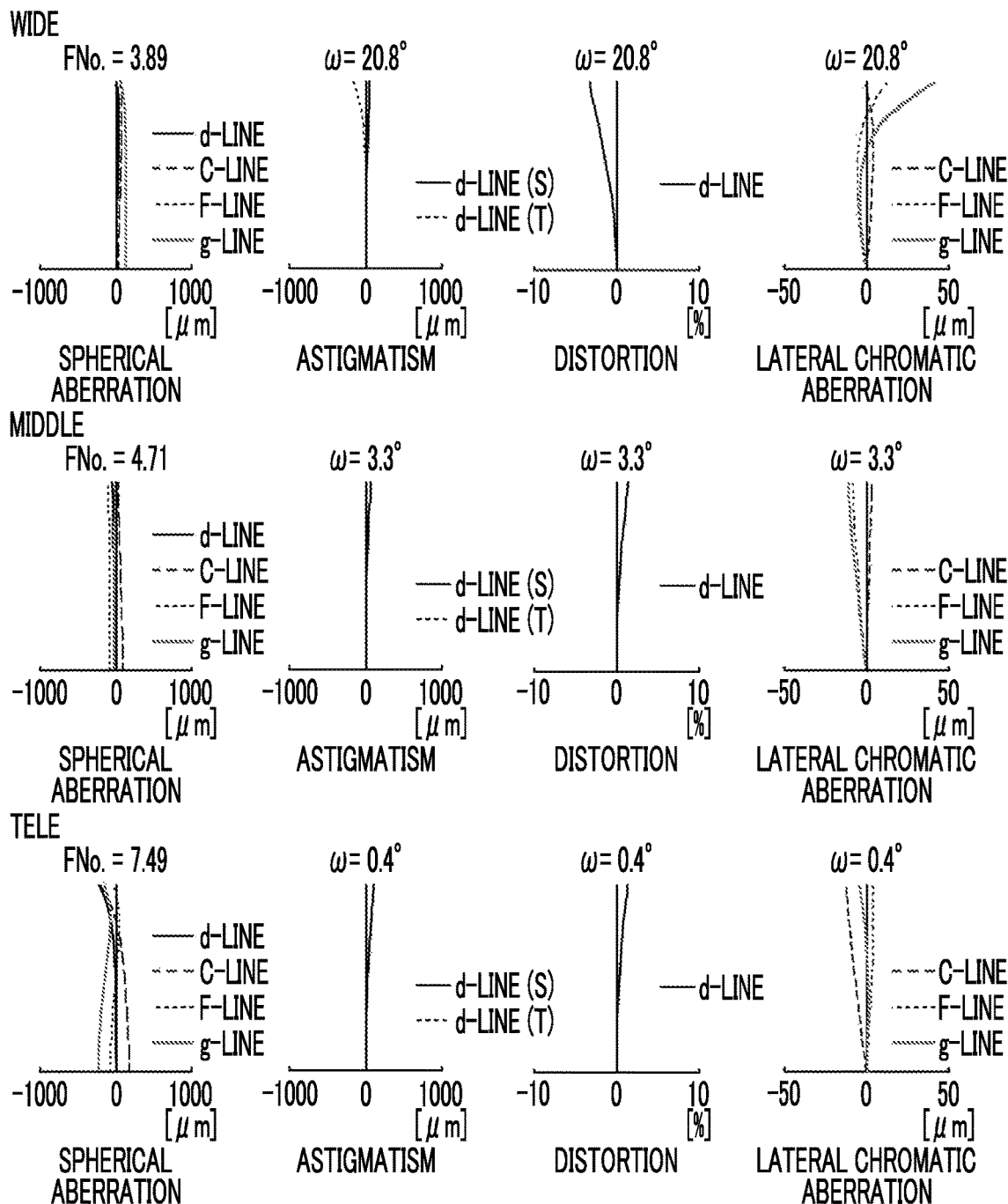
FIG. 16 is a diagram of aberrations of the zoom lens of Example 5 of the present invention.

FIG. 5 shows a lens configuration of the zoom lens of Example 5. The group configuration of the zoom lens of Example 5 is the same as that of Example 1. In Example 5, the first lens group G1 includes, in order from the object side, the first to fourth lenses L11 to L14. The second lens group G2 includes, in order from the object side, lenses L21 to L23. The third lens group G3 includes, in order from the object side, lenses L31 to L33. The fourth lens group G4 includes, in order from the object side, lenses L41 to L45. Table 9 shows basic lens data of the zoom lens of Example 5, Table 10 shows specification and variable surface spacings, and FIG. 16 shows aberration diagrams in a state where the infinite object is in focus.

TABLE 9

Example 5

| Si | Ri | Di | Ndj | vdj | θgFj |
|---|---|---|---|---|---|
| 1 | 255.97127 | 2.500 | 1.48749 | 70.24 | 0.53007 |
| 2 | 106.34514 | 16.235 | 1.49700 | 81.54 | 0.53748 |
| 3 | −417.09106 | 0.398 | | | |
| 4 | 142.63823 | 13.180 | 1.49700 | 81.54 | 0.53748 |
| 5 | −483.92274 | 4.000 | 1.80100 | 34.97 | 0.58642 |
| 6 | 570.72629 | DD[6] | | | |
| 7 | −115.58671 | 1.000 | 2.00069 | 25.46 | 0.61364 |
| 8 | 59.59656 | 3.708 | | | |
| 9 | −47.54120 | 4.759 | 1.94595 | 17.98 | 0.65460 |

TABLE 9-continued

Example 5

| Si | Ri | Di | Ndj | vdj | θgFj |
|---|---|---|---|---|---|
| 10 | −19.28998 | 1.020 | 1.80440 | 39.59 | 0.57297 |
| 11 | −1412.36901 | DD[11] | | | |
| 12 | 77.13335 | 3.026 | 1.61800 | 63.33 | 0.54414 |
| 13 | −100.02536 | 0.100 | | | |
| 14 | 49.34256 | 1.000 | 1.90366 | 31.31 | 0.59481 |
| 15 | 25.08987 | 4.196 | 1.61800 | 63.33 | 0.54414 |
| 16 | 1056.49837 | DD[16] | | | |
| 17(St) | ∞ | 5.019 | | | |
| 18 | −55.50822 | 3.319 | 1.66680 | 33.05 | 0.59578 |
| 19 | 44.99991 | 6.659 | 1.84666 | 23.78 | 0.62054 |
| 20 | 1430.50742 | 22.976 | | | |
| 21 | 35.84652 | 1.598 | 1.88100 | 40.14 | 0.57010 |
| 22 | 25.83913 | 2.828 | 1.59522 | 67.73 | 0.54426 |
| 23 | −67.82242 | 0.827 | | | |
| 24 | 24.65415 | 0.918 | 1.61800 | 63.33 | 0.54414 |
| 25 | 13.14361 | 20.000 | | | |
| 26 | ∞ | 1.500 | 1.51680 | 64.20 | 0.53430 |
| 27 | ∞ | 17.529 | | | |

TABLE 10

Example 5

| | WIDE | MIDDLE | TELE |
|---|---|---|---|
| Zr | 1.0 | 6.3 | 57.6 |
| f | 12.729 | 80.383 | 733.822 |
| FNo. | 3.89 | 4.71 | 7.49 |
| 2ω(°) | 41.6 | 6.6 | 0.8 |
| DD[6] | 8.597 | 108.499 | 148.669 |
| DD[11] | 202.845 | 87.388 | 3.534 |
| DD[16] | 2.529 | 18.084 | 61.768 |

Example 6

Figure 6:
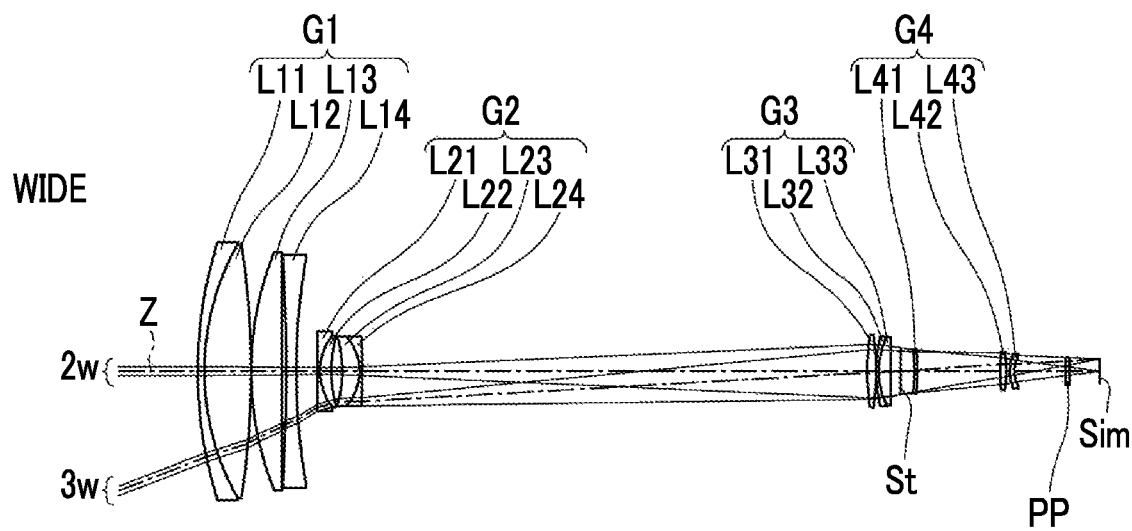
FIG. 6 is a cross-sectional view illustrating a configuration and an optical path of a zoom lens of Example 6 of the present invention.
Figure 6:
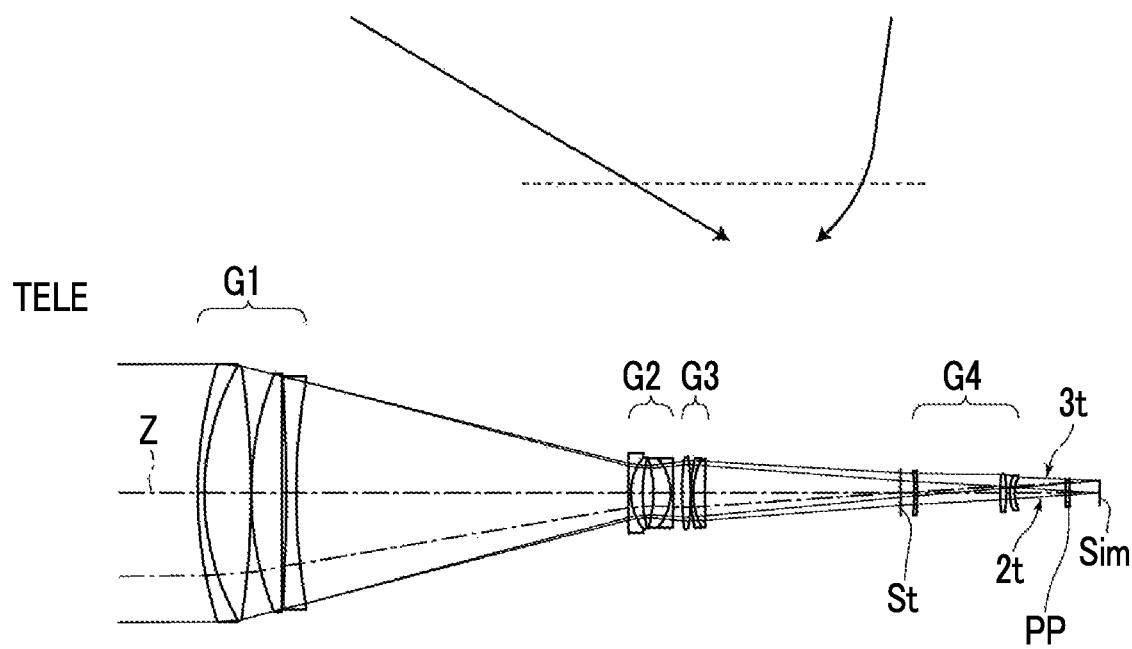
Figure 17:
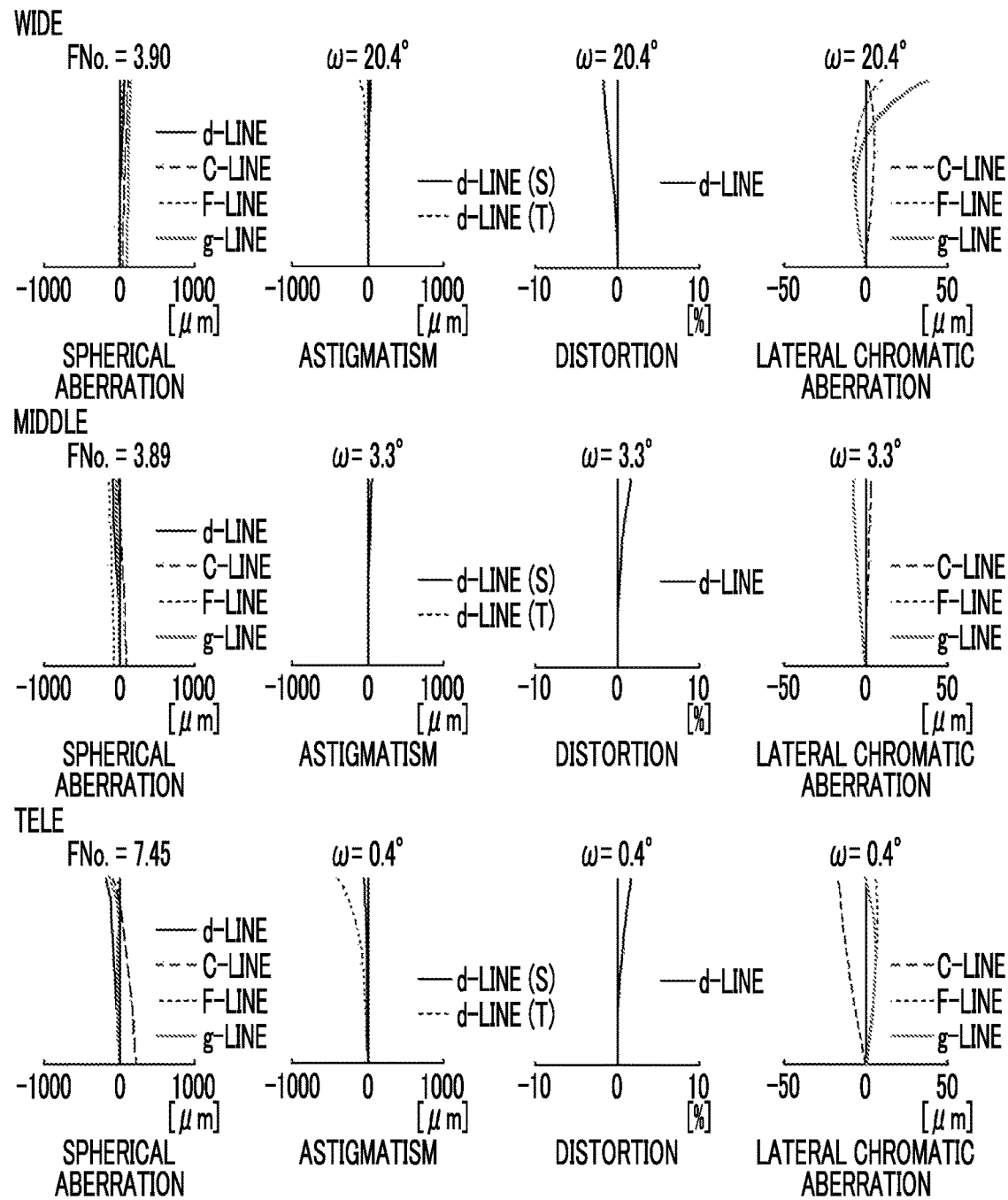
FIG. 17 is a diagram of aberrations of the zoom lens of Example 6 of the present invention.

FIG. 6 shows a lens configuration of the zoom lens of Example 6. The group configuration of the zoom lens of Example 6 is the same as that of Example 1. In Example 6, the first lens group G1 includes, in order from the object side, the first to fourth lenses L11 to L14. The second lens group G2 includes, in order from the object side, lenses L21 to L24. The third lens group G3 includes, in order from the object side, lenses L31 to L33. The fourth lens group G4 includes, in order from the object side, lenses L41 to L43. Table 11 shows basic lens data of the zoom lens of Example 6, Table 12 shows specification and variable surface spacings, and FIG. 17 shows aberration diagrams in a state where the infinite object is in focus.

TABLE 11

Example 6

| Si | Ri | Di | Ndj | vdj | θgFj |
|---|---|---|---|---|---|
| 1 | 162.83295 | 2.520 | 1.51680 | 64.20 | 0.53430 |
| 2 | 97.03196 | 18.237 | 1.49700 | 81.54 | 0.53748 |
| 3 | −320.11075 | 0.100 | | | |
| 4 | 120.70708 | 11.938 | 1.49700 | 81.54 | 0.53748 |
| 5 | ∞ | 1.669 | | | |
| 6 | −715.57927 | 4.000 | 1.72342 | 37.95 | 0.58370 |
| 7 | 249.37292 | DD[7] | | | |
| 8 | 3498.29151 | 1.000 | 2.00069 | 25.46 | 0.61364 |
| 9 | 21.68831 | 4.483 | 1.92286 | 20.88 | 0.62825 |
| 10 | 48.22412 | 4.262 | | | |
| 11 | −46.03674 | 6.728 | 1.95906 | 17.47 | 0.65993 |
| 12 | −19.65817 | 1.020 | 1.90366 | 31.31 | 0.59481 |

TABLE 11-continued

Example 6

| Si | Ri | Di | Ndj | vdj | θgFj |
|---|---|---|---|---|---|
| 13 | −454.92022 | DD[13] | | | |
| 14 | 89.74452 | 3.425 | 1.61800 | 63.33 | 0.54414 |
| 15 | −106.98162 | 0.100 | | | |
| 16 | 54.76088 | 1.000 | 1.90366 | 31.31 | 0.59481 |
| 17 | 28.56140 | 4.535 | 1.61800 | 63.33 | 0.54414 |
| 18 | 684.86066 | DD[18] | | | |
| 19(St) | ∞ | 5.444 | | | |
| 20 | −48.94954 | 1.096 | 1.51680 | 64.20 | 0.53430 |
| 21 | −112.20951 | 32.772 | | | |
| 22 | 90.78467 | 2.327 | 1.51680 | 64.20 | 0.53430 |
| 23 | −46.73242 | 1.337 | | | |
| 24 | 16.21666 | 1.856 | 1.83481 | 42.72 | 0.56514 |
| 25 | 12.24512 | 20.000 | | | |
| 26 | ∞ | 1.500 | 1.51680 | 64.20 | 0.53430 |
| 27 | ∞ | 11.750 | | | |

TABLE 12

Example 6

| | WIDE | MIDDLE | TELE |
|---|---|---|---|
| Zr | 1.0 | 6.3 | 57.6 |
| f | 12.746 | 80.494 | 734.831 |
| FNo. | 3.90 | 3.89 | 7.45 |
| 2ω(°) | 40.8 | 6.6 | 0.8 |
| DD[7] | 8.232 | 95.653 | 129.445 |
| DD[13] | 197.009 | 89.986 | 3.371 |
| DD[18] | 4.020 | 23.622 | 76.446 |

Example 7

Figure 7:
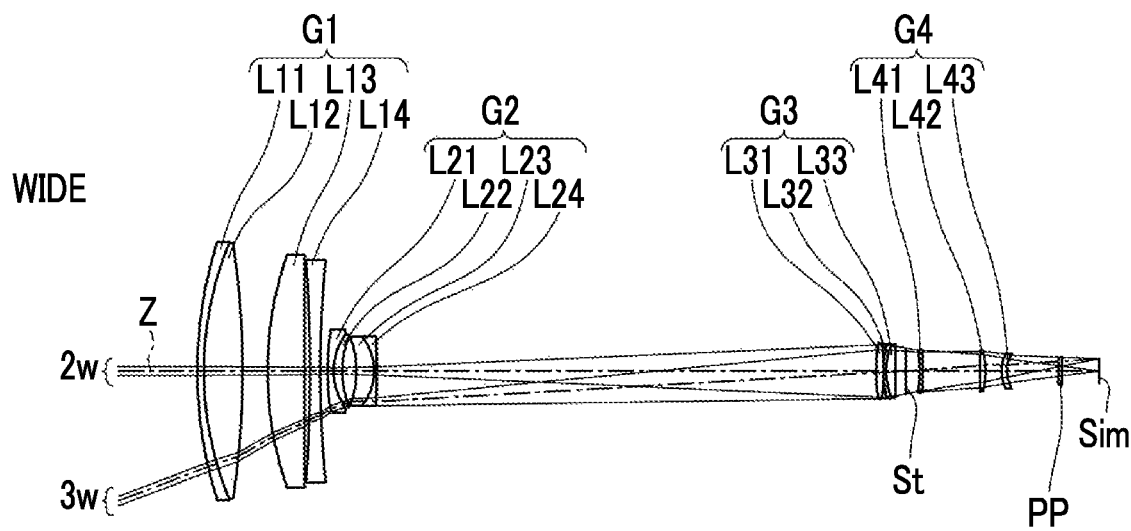
FIG. 7 is a cross-sectional view illustrating a configuration and an optical path of a zoom lens of Example 7 of the present invention.
Figure 7:
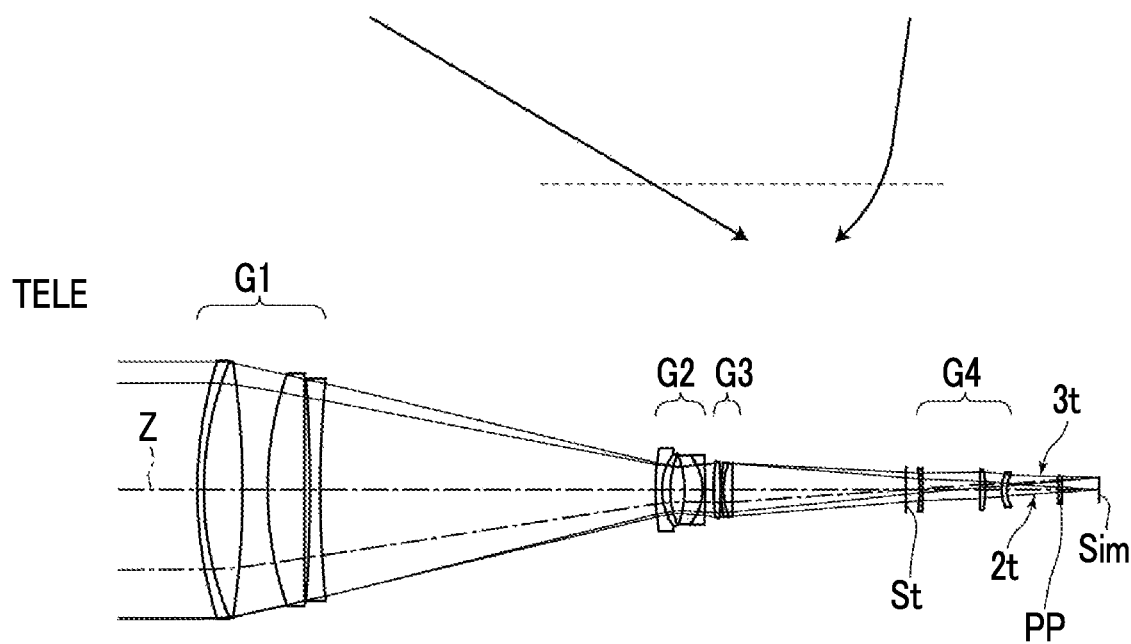
Figure 18:
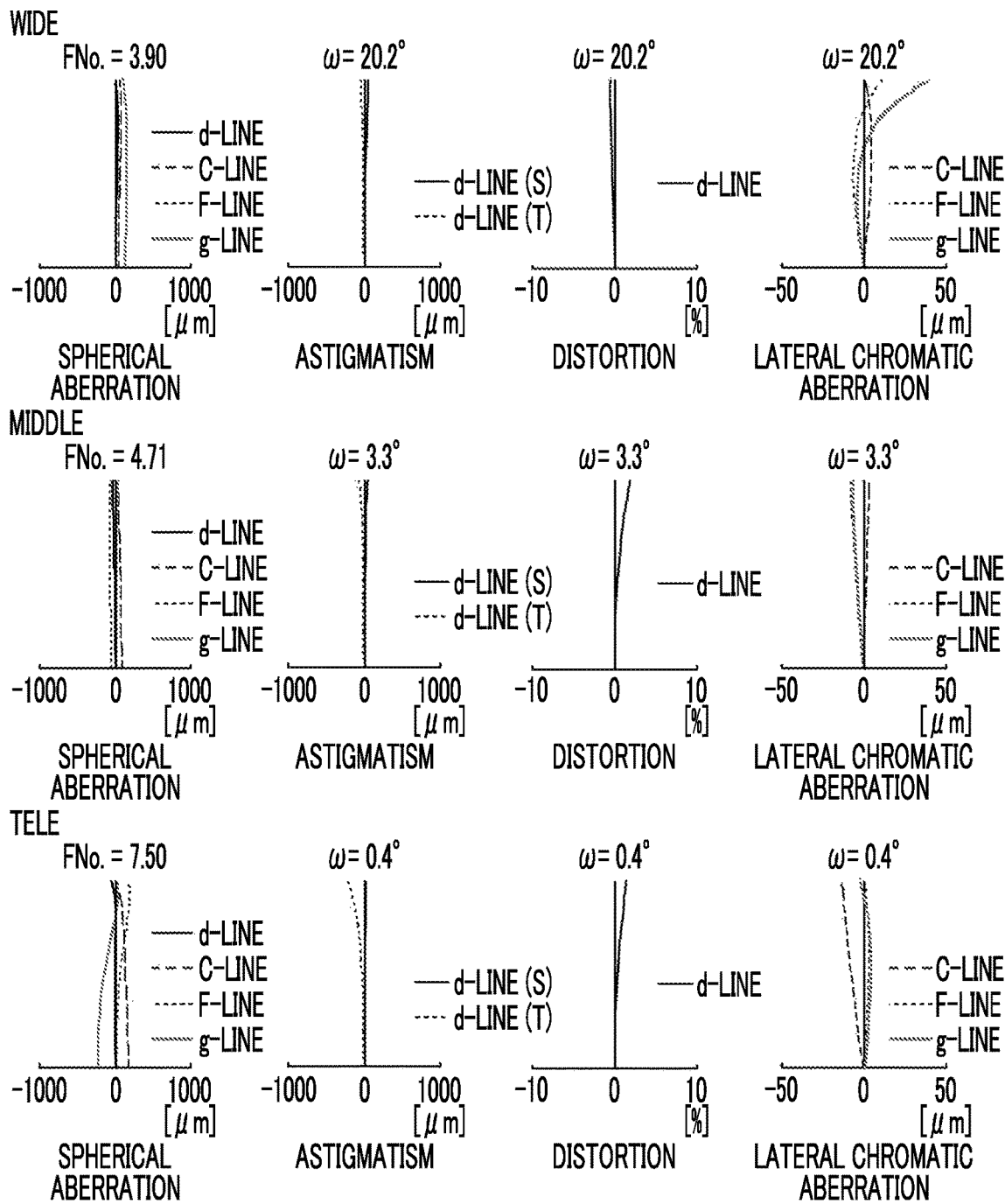
FIG. 18 is a diagram of aberrations of the zoom lens of Example 7 of the present invention.

FIG. 7 shows a lens configuration of the zoom lens of Example 7. The group configuration of the zoom lens of Example 7 is the same as that of Example 1. In Example 7, the first lens group G1 includes, in order from the object side, the first to fourth lenses L11 to L14. The second lens group G2 includes, in order from the object side, lenses L21 to L24. The third lens group G3 includes, in order from the object side, lenses L31 to L33. The fourth lens group G4 includes, in order from the object side, lenses L41 to L43. Table 13 shows basic lens data of the zoom lens of Example 7, Table 14 shows specification and variable surface spacings, and FIG. 18 shows aberration diagrams in a state where the infinite object is in focus.

TABLE 13

Example 7

| Si | Ri | Di | Ndj | vdj | θgFj |
|---|---|---|---|---|---|
| 1 | 161.41564 | 2.520 | 1.48749 | 70.24 | 0.53007 |
| 2 | 125.68133 | 15.158 | 1.43875 | 94.94 | 0.53433 |
| 3 | −319.57785 | 9.708 | | | |
| 4 | 133.17648 | 14.534 | 1.49700 | 81.54 | 0.53748 |
| 5 | ∞ | 2.064 | | | |
| 6 | −580.86386 | 4.000 | 1.80100 | 34.97 | 0.58642 |
| 7 | 426.05938 | DD[7] | | | |
| 8 | 97.93224 | 2.410 | 2.00069 | 25.46 | 0.61364 |
| 9 | 23.45298 | 3.298 | 1.94595 | 17.98 | 0.65460 |
| 10 | 33.79631 | 5.553 | | | |
| 11 | −36.93320 | 7.000 | 1.95906 | 17.47 | 0.65993 |
| 12 | −20.44514 | 1.020 | 1.91082 | 35.25 | 0.58224 |
| 13 | −236.55113 | DD[13] | | | |
| 14 | 79.29405 | 2.745 | 1.61800 | 63.33 | 0.54414 |
| 15 | −109.22288 | 0.100 | | | |

TABLE 13-continued

Example 7

| Si | Ri | Di | Ndj | vdj | θgFj |
|---|---|---|---|---|---|
| 16 | 50.98889 | 1.000 | 1.90366 | 31.31 | 0.59481 |
| 17 | 26.11840 | 3.565 | 1.61800 | 63.33 | 0.54414 |
| 18 | 1936.71499 | DD[18] | | | |
| 19(St) | ∞ | 5.386 | | | |
| 20 | −43.27393 | 1.000 | 1.51680 | 64.20 | 0.53430 |
| 21 | −355.60325 | 22.850 | | | |
| 22 | 578.08958 | 2.074 | 1.51680 | 64.20 | 0.53430 |
| 23 | −37.48658 | 6.336 | | | |
| 24 | 14.93558 | 2.128 | 1.83481 | 42.72 | 0.56514 |
| 25 | 11.93520 | 20.000 | | | |
| 26 | ∞ | 1.500 | 1.51680 | 64.20 | 0.53430 |
| 27 | ∞ | 14.505 | | | |

TABLE 14

Example 7

| | WIDE | MIDDLE | TELE |
|---|---|---|---|
| Zr | 1.0 | 6.3 | 57.6 |
| f | 12.740 | 80.456 | 734.488 |
| FNo. | 3.90 | 4.71 | 7.50 |
| 2ω(°) | 40.4 | 6.6 | 0.8 |
| DD[7] | 2.871 | 94.551 | 130.752 |
| DD[13] | 194.778 | 86.151 | 3.335 |
| DD[18] | 4.183 | 21.130 | 67.746 |

Example 8

Figure 8:
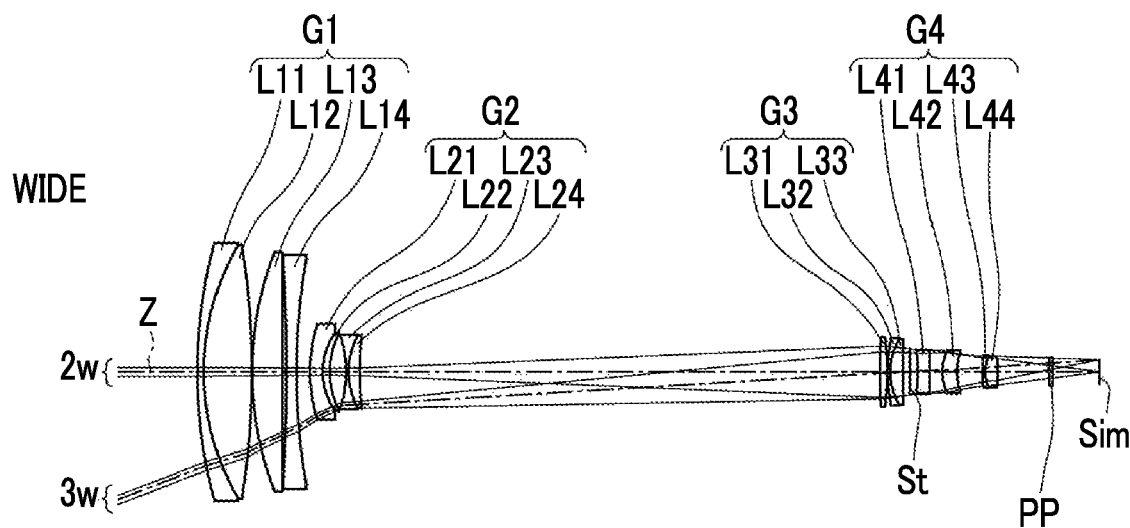
FIG. 8 is a cross-sectional view illustrating a configuration and an optical path of a zoom lens of Example 8 of the present invention.
Figure 8:
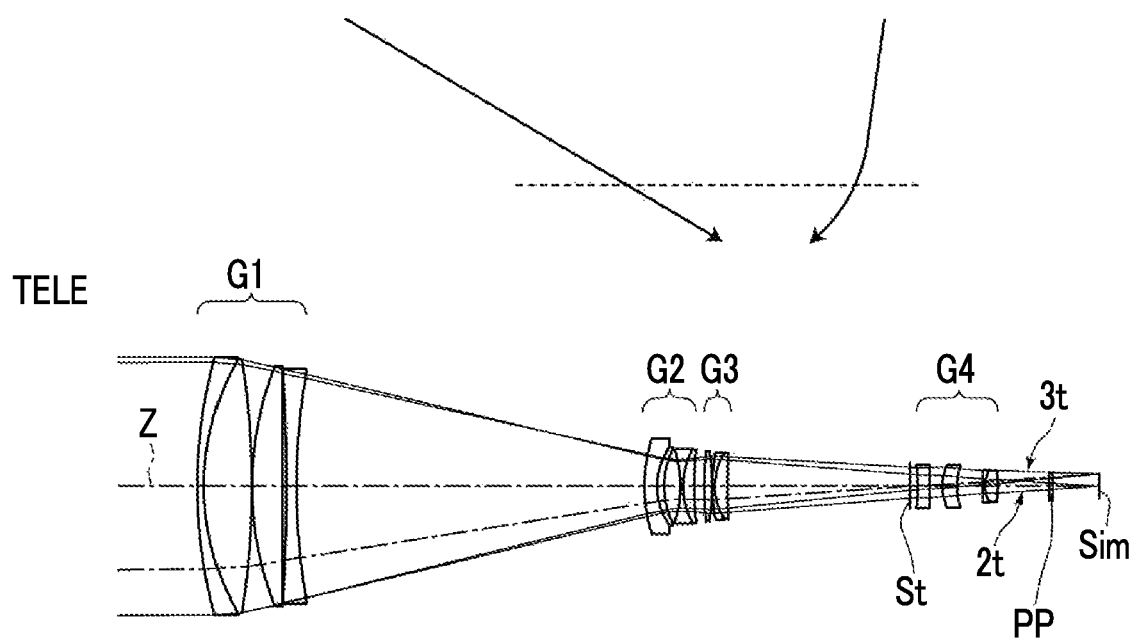
Figure 19:
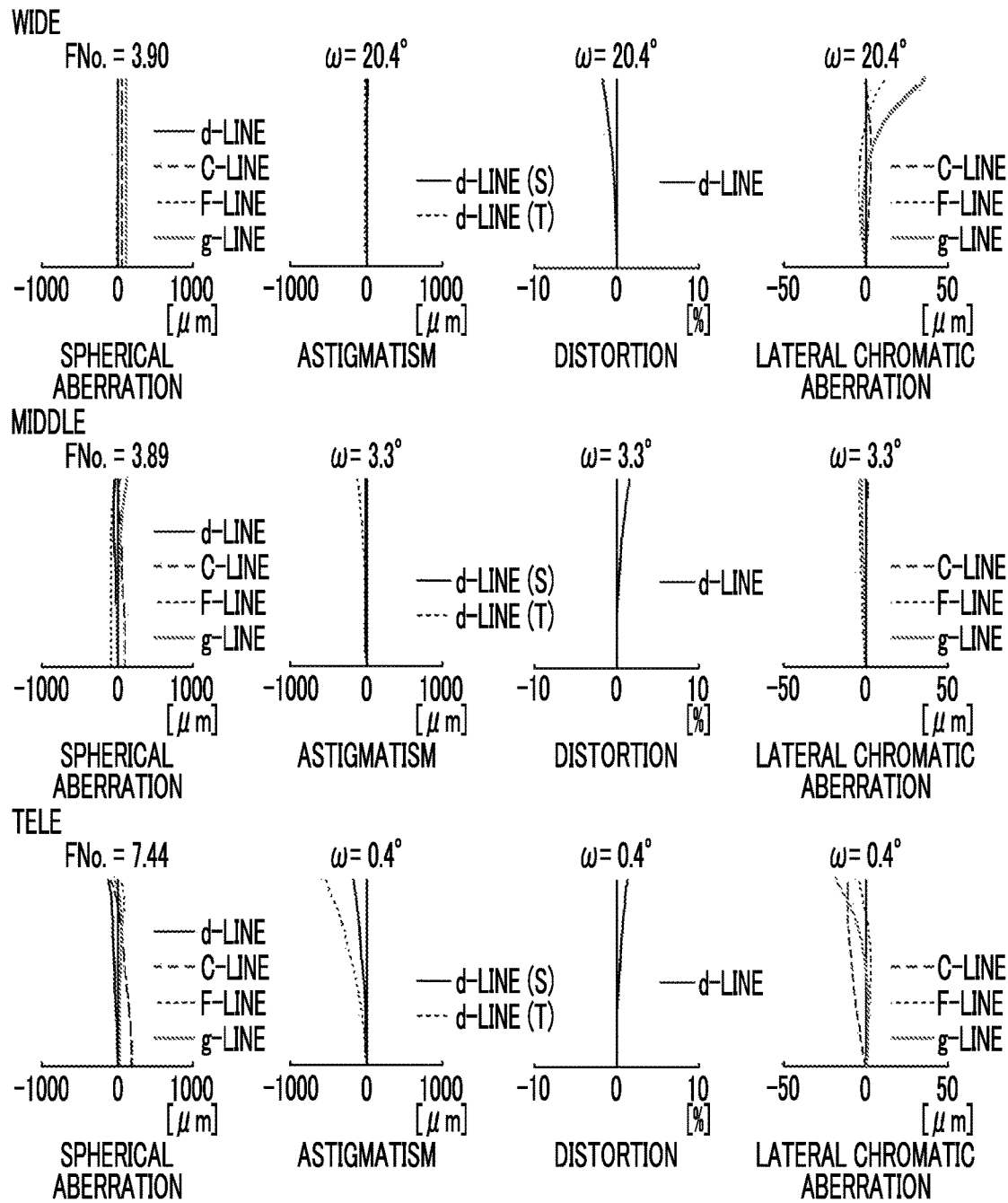
FIG. 19 is a diagram of aberrations of the zoom lens of Example 8 of the present invention.

FIG. 8 shows a lens configuration of the zoom lens of Example 8. The group configuration of the zoom lens of Example 8 is the same as that of Example 1. In Example 8, the first lens group G1 includes, in order from the object side, the first to fourth lenses L11 to L14. The second lens group G2 includes, in order from the object side, lenses L21 to L24. The third lens group G3 includes, in order from the object side, lenses L31 to L33. The fourth lens group G4 includes, in order from the object side, lenses L41 to L44. Table 15 shows basic lens data of the zoom lens of Example 8, Table 16 shows specification and variable surface spacings, and FIG. 19 shows aberration diagrams in a state where the infinite object is in focus.

TABLE 15

Example 8

| Si | Ri | Di | Ndj | vdj | θgFj |
|---|---|---|---|---|---|
| 1 | 186.09758 | 2.520 | 1.51680 | 64.20 | 0.53430 |
| 2 | 98.71443 | 18.466 | 1.49700 | 81.54 | 0.53748 |
| 3 | −306.22286 | 0.100 | | | |
| 4 | 123.65574 | 11.809 | 1.49700 | 81.54 | 0.53748 |
| 5 | ∞ | 1.574 | | | |
| 6 | −783.08822 | 4.000 | 1.72342 | 37.95 | 0.58370 |
| 7 | 247.05220 | DD[7] | | | |
| 8 | 60.02624 | 4.984 | 2.00069 | 25.46 | 0.61364 |
| 9 | 25.90943 | 2.745 | 1.92286 | 20.88 | 0.63900 |
| 10 | 31.67503 | 6.393 | | | |
| 11 | −43.41605 | 1.020 | 1.85150 | 40.78 | 0.56958 |
| 12 | 29.45792 | 4.397 | 1.95906 | 17.47 | 0.65993 |
| 13 | 144.55491 | DD[13] | | | |
| 14 | 166.49179 | 2.955 | 1.71300 | 53.87 | 0.54587 |
| 15 | −92.22339 | 0.100 | | | |
| 16 | 61.30233 | 1.000 | 1.67270 | 32.10 | 0.59891 |
| 17 | 23.32657 | 5.020 | 1.61800 | 63.33 | 0.54414 |
| 18 | 370.88352 | DD[18] | | | |

TABLE 15-continued

Example 8

| Si | Ri | Di | Ndj | vdj | θgFj |
|---|---|---|---|---|---|
| 19(St) | ∞ | 3.100 | | | |
| 20 | −69.66425 | 4.619 | 1.90366 | 31.31 | 0.59481 |
| 21 | −445.77037 | 5.000 | | | |
| 22 | 18.68007 | 5.817 | 1.66680 | 33.05 | 0.59578 |
| 23 | 23.38243 | 10.001 | | | |
| 24 | 126.79348 | 0.900 | 1.91082 | 35.25 | 0.58224 |
| 25 | 12.44186 | 5.010 | 1.62004 | 36.26 | 0.58800 |
| 26 | −46.30750 | 20.000 | | | |
| 27 | ∞ | 1.500 | 1.51680 | 64.20 | 0.53430 |
| 28 | ∞ | 18.213 | | | |

TABLE 16

Example 8

| | WIDE | MIDDLE | TELE |
|---|---|---|---|
| Zr | 1.0 | 6.3 | 57.6 |
| f | 12.739 | 80.448 | 734.418 |
| FNo. | 3.90 | 3.89 | 7.44 |
| 2ω(°) | 40.8 | 6.6 | 0.8 |
| DD[7] | 5.265 | 99.062 | 136.093 |
| DD[13] | 203.358 | 91.344 | 3.941 |
| DD[18] | 2.678 | 20.895 | 71.266 |

Example 9

Figure 9:
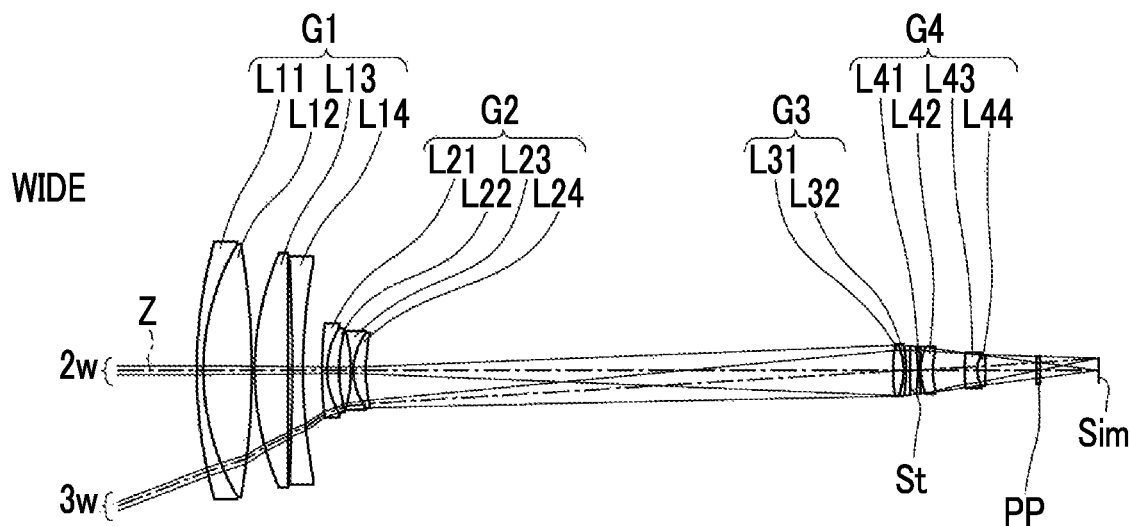
FIG. 9 is a cross-sectional view illustrating a configuration and an optical path of a zoom lens of Example 9 of the present invention.
Figure 9:
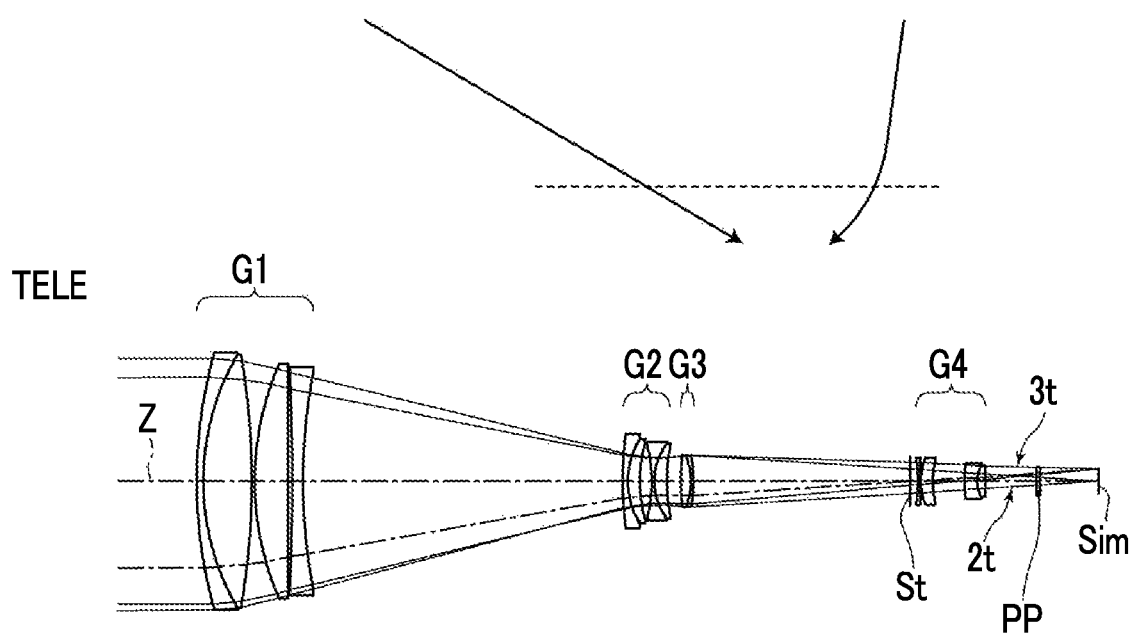
Figure 20:
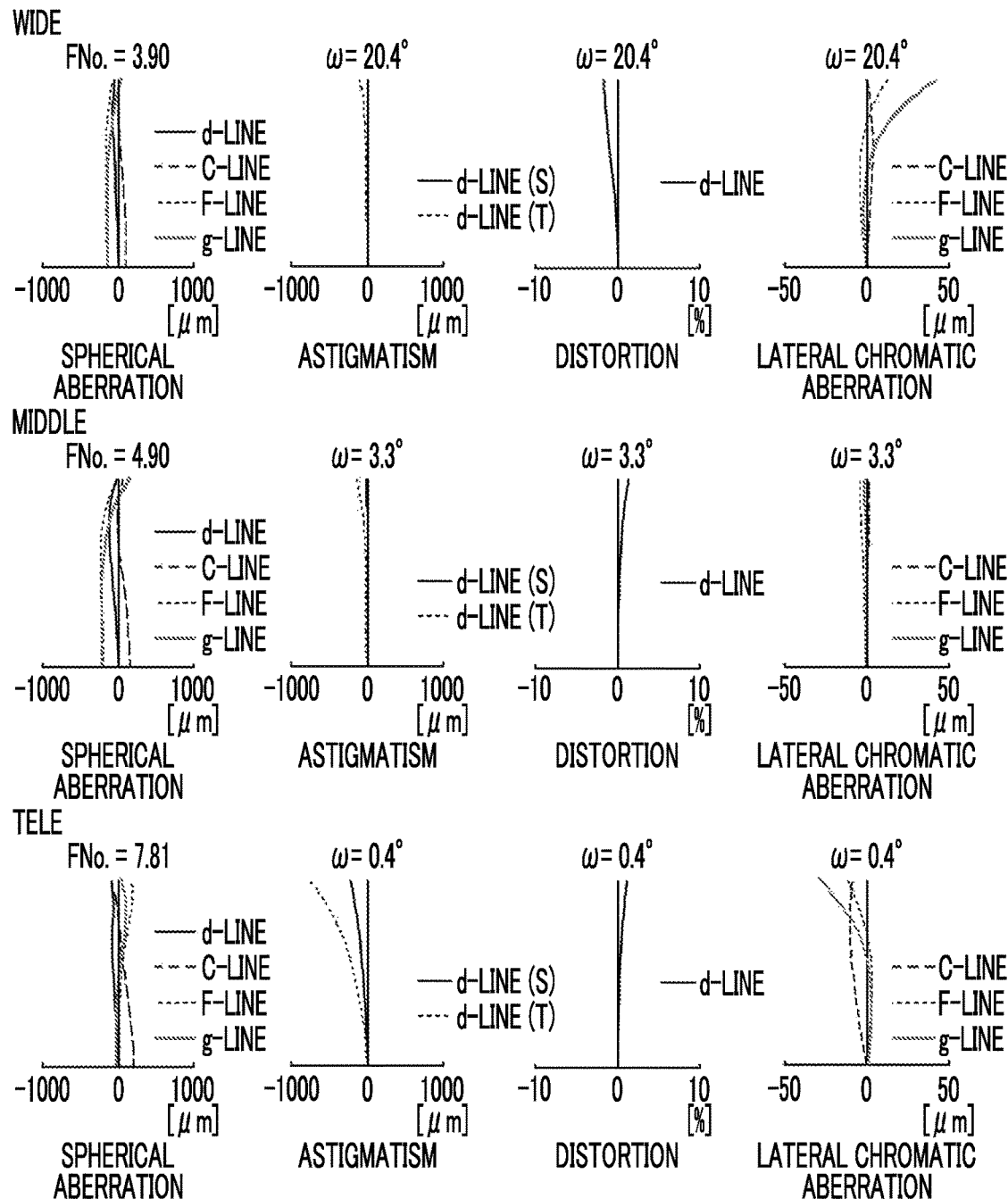
FIG. 20 is a diagram of aberrations of the zoom lens of Example 9 of the present invention.

FIG. 9 shows a lens configuration of the zoom lens of Example 9. The group configuration of the zoom lens of Example 9 is the same as that of Example 1. In Example 9, the first lens group G1 includes, in order from the object side, the first to fourth lenses L11 to L14. The second lens group G2 includes, in order from the object side, lenses L21 to L24. The third lens group G3 includes, in order from the object side, lenses L31 and L32. The fourth lens group G4 includes, in order from the object side, lenses L41 to L44. Table 17 shows basic lens data of the zoom lens of Example 9, Table 18 shows specification and variable surface spacings, and FIG. 20 shows aberration diagrams in a state where the infinite object is in focus.

TABLE 17

Example 9

| Si | Ri | Di | Ndj | vdj | θgFj |
|---|---|---|---|---|---|
| 1 | 180.92676 | 2.520 | 1.51680 | 64.20 | 0.53430 |
| 2 | 94.52577 | 19.006 | 1.49700 | 81.54 | 0.53748 |
| 3 | −284.04969 | 1.173 | | | |
| 4 | 110.32871 | 13.036 | 1.49700 | 81.54 | 0.53748 |
| 5 | ∞ | 1.726 | | | |
| 6 | −783.87662 | 4.124 | 1.72342 | 37.95 | 0.58370 |
| 7 | 212.69797 | DD[7] | | | |
| 8 | 144.41987 | 2.025 | 2.00069 | 25.46 | 0.61364 |
| 9 | 30.00032 | 4.702 | 1.92286 | 20.88 | 0.63900 |
| 10 | 54.64235 | 4.667 | | | |
| 11 | −55.60288 | 1.020 | 1.83400 | 37.16 | 0.57759 |
| 12 | 23.68466 | 4.883 | 1.95906 | 17.47 | 0.65993 |
| 13 | 66.90974 | DD[13] | | | |
| 14 | 94.08195 | 3.950 | 1.71300 | 53.87 | 0.54587 |
| 15 | −25.23538 | 1.000 | 1.90366 | 31.31 | 0.59481 |
| 16 | −53.80885 | DD[16] | | | |
| 17(St) | ∞ | 3.100 | | | |
| 18 | −63.14015 | 1.000 | 1.77250 | 49.60 | 0.55212 |
| 19 | −527.19303 | 0.100 | | | |
| 20 | 22.09258 | 4.835 | 1.61800 | 63.33 | 0.54414 |

TABLE 17-continued

Example 9

| Si | Ri | Di | Ndj | vdj | θgFj |
|---|---|---|---|---|---|
| 21 | 34.67478 | 12.727 | | | |
| 22 | 47.56759 | 4.984 | 1.88300 | 40.76 | 0.56679 |
| 23 | 12.20283 | 3.178 | 1.59551 | 39.24 | 0.58043 |
| 24 | −230.44814 | 20.000 | | | |
| 25 | ∞ | 1.500 | 1.51680 | 64.20 | 0.53430 |
| 26 | ∞ | 22.848 | | | |

TABLE 18

Example 9

| | WIDE | MIDDLE | TELE |
|---|---|---|---|
| Zr | 1.0 | 6.3 | 57.6 |
| f | 12.748 | 80.507 | 734.949 |
| FNo. | 3.90 | 4.90 | 7.81 |
| 2ω(°) | 40.8 | 6.6 | 0.8 |
| DD[7] | 7.431 | 92.639 | 124.983 |
| DD[13] | 206.335 | 98.372 | 5.460 |
| DD[16] | 1.511 | 24.266 | 84.834 |

Example 10

Figure 10:
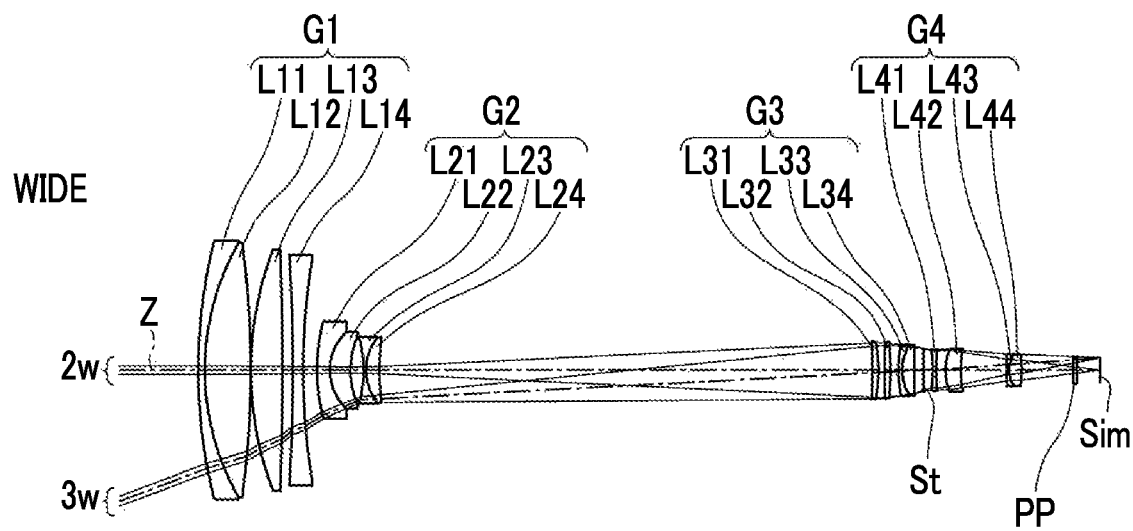
FIG. 10 is a cross-sectional view illustrating a configuration and an optical path of a zoom lens of Example 10 of the present invention.
Figure 10:
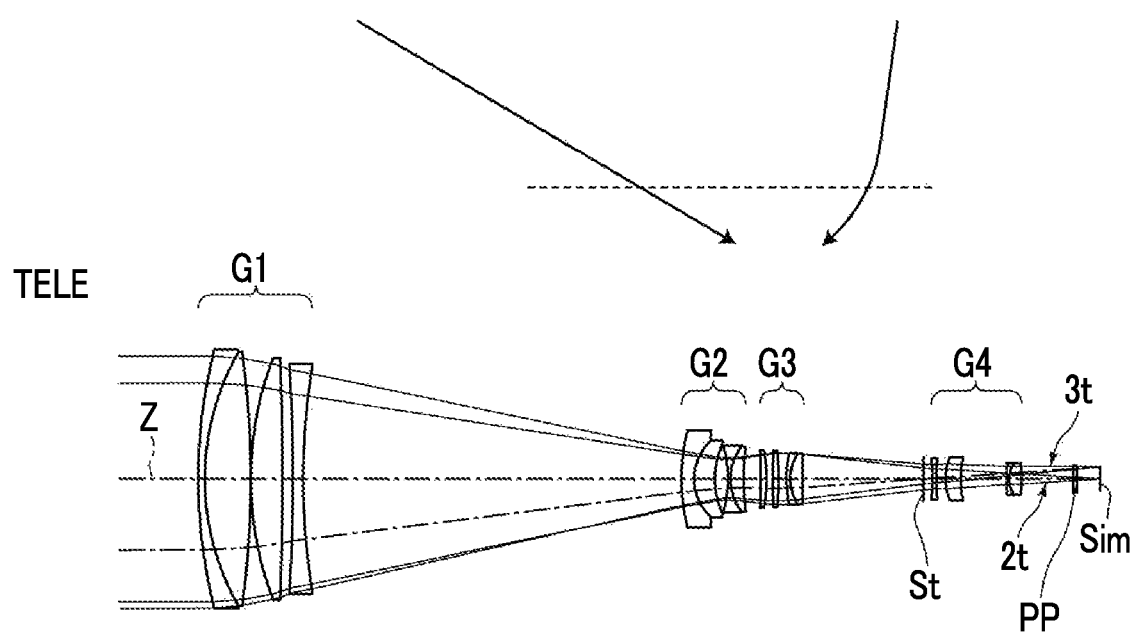
Figure 21:
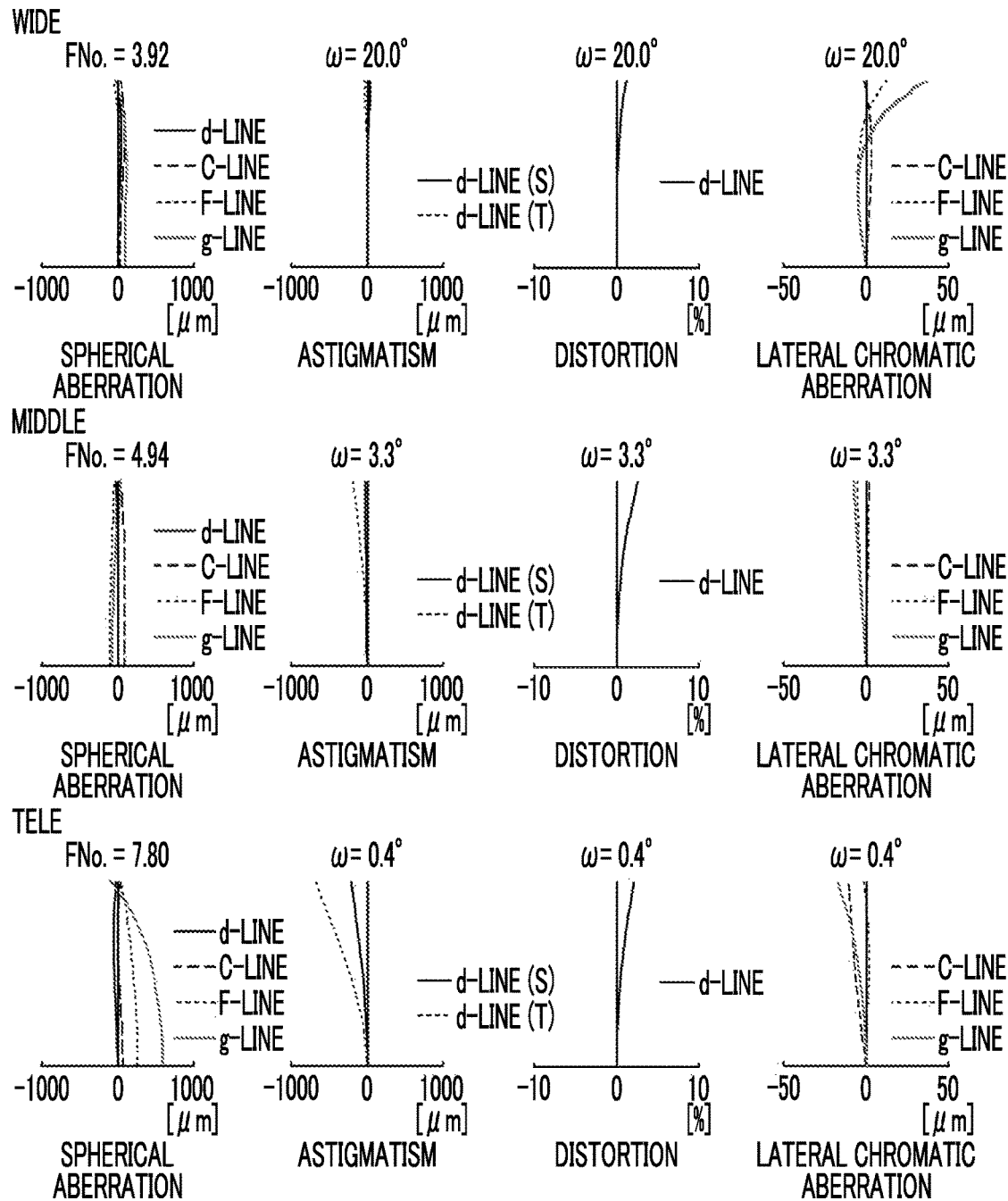
FIG. 21 is a diagram of aberrations of the zoom lens of Example 10 of the present invention.

FIG. 10 shows a lens configuration of the zoom lens of Example 10. The group configuration of the zoom lens of Example 10 is the same as that of Example 1. In Example 10, the first lens group G1 includes, in order from the object side, the first to fourth lenses L11 to L14. The second lens group G2 includes, in order from the object side, lenses L21 to L24. The third lens group G3 includes, in order from the object side, lenses L31 to L34. The fourth lens group G4 includes, in order from the object side, lenses L41 to L44. Table 19 shows basic lens data of the zoom lens of Example 10, Table 20 shows specification and variable surface spacings, and FIG. 21 shows aberration diagrams in a state where the infinite object is in focus.

TABLE 19

Example 10

| Si | Ri | Di | Ndj | vdj | θgFj |
|---|---|---|---|---|---|
| 1 | 200.70404 | 2.520 | 1.51680 | 64.20 | 0.53430 |
| 2 | 96.40830 | 17.892 | 1.49700 | 81.54 | 0.53748 |
| 3 | −363.13872 | 0.117 | | | |
| 4 | 128.03255 | 12.263 | 1.49700 | 81.54 | 0.53748 |
| 5 | −1482.97512 | 4.084 | | | |
| 6 | −742.62325 | 4.000 | 1.76200 | 40.10 | 0.57655 |
| 7 | 253.89024 | DD[7] | | | |
| 8 | 73.32512 | 5.000 | 1.95375 | 32.32 | 0.59015 |
| 9 | 19.79985 | 8.020 | 1.90366 | 31.31 | 0.59481 |
| 10 | 31.04454 | 5.129 | | | |
| 11 | −44.00180 | 1.020 | 1.88100 | 40.14 | 0.57010 |
| 12 | 20.00014 | 5.207 | 1.92286 | 20.88 | 0.63900 |
| 13 | 121.71146 | DD[13] | | | |
| 14 | −309.58271 | 2.422 | 1.49700 | 81.54 | 0.53748 |
| 15 | −54.76137 | 2.444 | | | |
| 16 | 366.48003 | 2.259 | 1.49700 | 81.54 | 0.53748 |
| 17 | −92.63774 | 3.057 | | | |
| 18 | 47.74722 | 1.500 | 1.62588 | 35.70 | 0.58935 |
| 19 | 18.11373 | 4.728 | 1.61800 | 63.33 | 0.54414 |
| 20 | 514.97999 | DD[20] | | | |
| 21(St) | ∞ | 3.725 | | | |
| 22 | −51.82775 | 1.385 | 1.88300 | 40.80 | 0.56557 |
| 23 | 77.99680 | 3.857 | | | |
| 24 | 20.13447 | 6.000 | 1.63980 | 34.47 | 0.59233 |

TABLE 19-continued

Example 10

| Si | Ri | Di | Ndj | vdj | θgFj |
|---|---|---|---|---|---|
| 25 | 41.31384 | 17.958 | | | |
| 26 | 118.21005 | 0.900 | 1.85150 | 40.78 | 0.56958 |
| 27 | 10.34443 | 5.010 | 1.59551 | 39.24 | 0.58043 |
| 28 | −39.13153 | 20.000 | | | |
| 29 | ∞ | 1.500 | 1.51680 | 64.20 | 0.53430 |
| 30 | ∞ | 9.032 | | | |

TABLE 20

Example 10

| | WIDE | MIDDLE | TELE |
|---|---|---|---|
| Zr | 1.0 | 6.3 | 57.6 |
| f | 12.705 | 80.231 | 732.437 |
| FNo. | 3.92 | 4.94 | 7.80 |
| 2ω(°) | 40.0 | 6.6 | 0.8 |
| DD[7] | 5.497 | 106.159 | 147.464 |
| DD[13] | 192.124 | 80.129 | 6.472 |
| DD[20] | 3.497 | 14.830 | 47.182 |

Example 11

Figure 11:
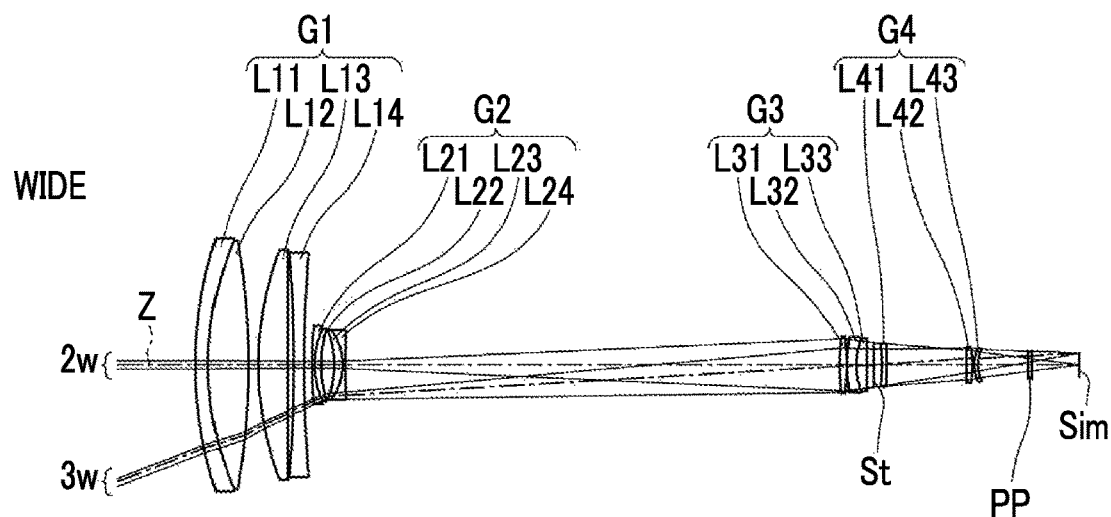
FIG. 11 is a cross-sectional view illustrating a configuration and an optical path of a zoom lens of Example 11 of the present invention.
Figure 11:
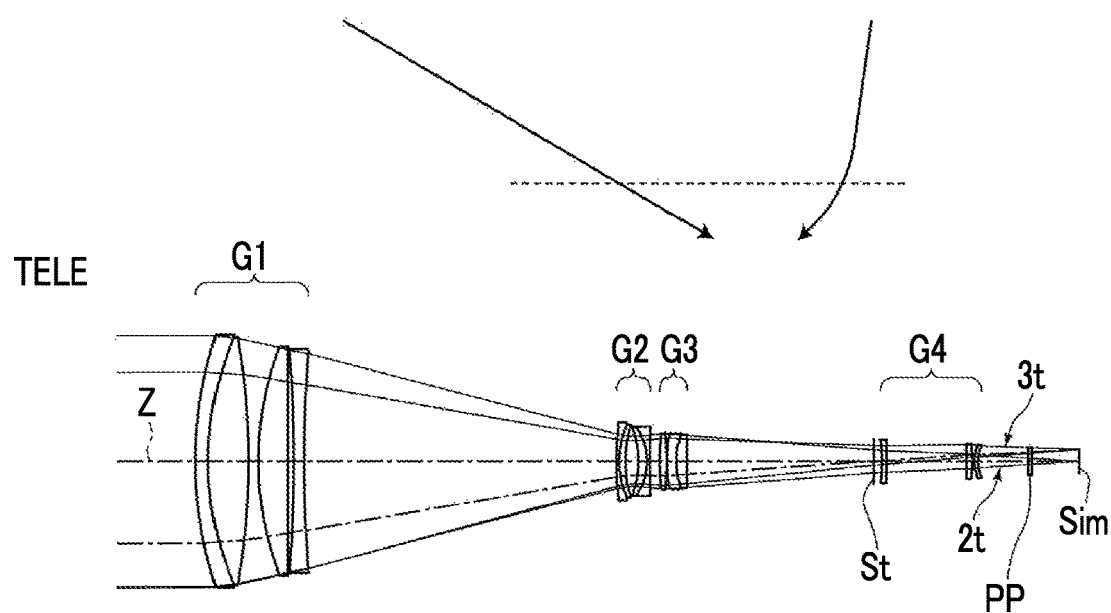
Figure 22:
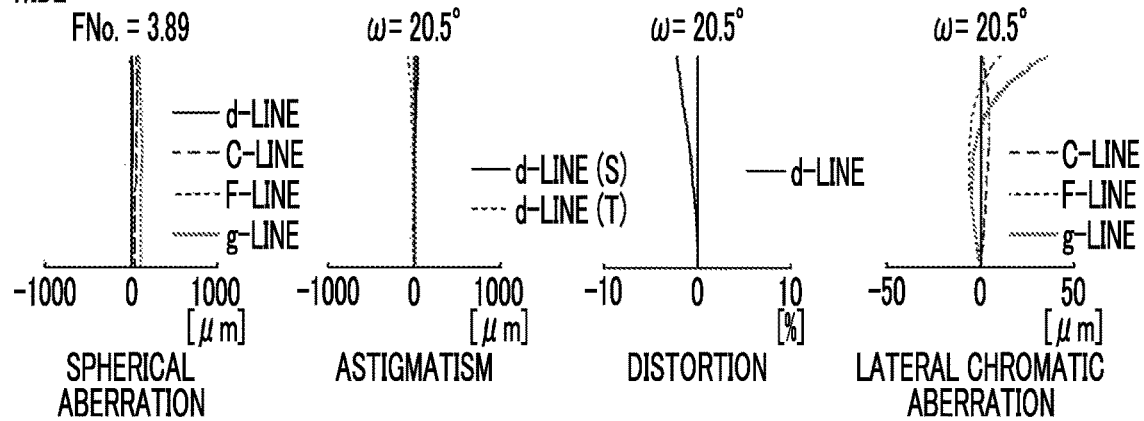
FIG. 22 is a diagram of aberrations of the zoom lens of Example 11 of the present invention.
Figure 22:
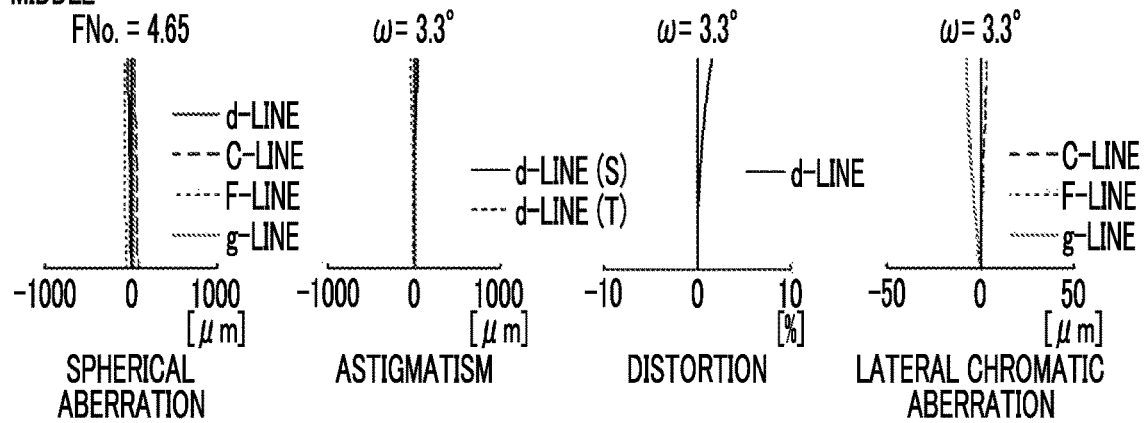
Figure 22:
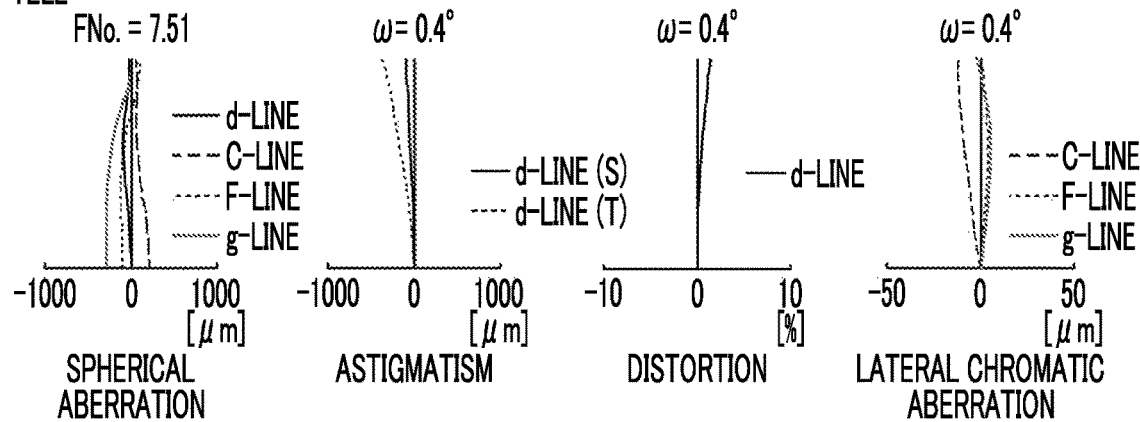

FIG. 11 shows a lens configuration of the zoom lens of Example 11. A group configuration of the zoom lens of Example 11 is the same as that of Example 1 except that the fourth lens group G4 has a positive refractive power. In Example 11, the first lens group G1 includes, in order from the object side, the first to fourth lenses L11 to L14. The second lens group G2 includes, in order from the object side, lenses L21 to L24. The third lens group G3 includes, in order from the object side, lenses L31 to L33. The fourth lens group G4 includes, in order from the object side, lenses L41 to L43. Table 21 shows basic lens data of the zoom lens of Example 11, Table 22 shows specification and variable surface spacings, and FIG. 22 shows aberration diagrams in a state where the infinite object is in focus.

TABLE 21

Example 11

| Si | Ri | Di | Ndj | vdj | θgFj |
|---|---|---|---|---|---|
| 1 | 152.99867 | 5.045 | 1.60300 | 65.44 | 0.54022 |
| 2 | 118.52506 | 16.094 | 1.43875 | 94.94 | 0.53433 |
| 3 | −279.64991 | 3.911 | | | |
| 4 | 121.55702 | 11.839 | 1.43875 | 94.94 | 0.53433 |
| 5 | ∞ | 2.302 | | | |
| 6 | −533.75176 | 4.000 | 1.72047 | 34.71 | 0.58350 |
| 7 | 490.51125 | DD[7] | | | |
| 8 | 183.01113 | 1.000 | 2.00100 | 29.13 | 0.59952 |
| 9 | 33.88346 | 2.478 | 1.92286 | 20.88 | 0.63900 |
| 10 | 44.86951 | 5.186 | | | |
| 11 | −36.83072 | 3.456 | 1.95906 | 17.47 | 0.65993 |
| 12 | −22.62341 | 1.020 | 1.77250 | 49.60 | 0.55212 |
| 13 | 308.41883 | DD[13] | | | |
| 14 | 83.16488 | 2.786 | 1.61800 | 63.33 | 0.54414 |
| 15 | −109.60590 | 0.100 | | | |
| 16 | 53.66158 | 3.621 | 1.90366 | 31.31 | 0.59481 |
| 17 | 26.29923 | 4.297 | 1.61800 | 63.33 | 0.54414 |
| 18 | 621.66934 | DD[18] | | | |
| 19(St) | ∞ | 3.378 | | | |
| 20 | −53.25428 | 1.779 | 1.51680 | 64.20 | 0.53430 |
| 21 | −347.22370 | 31.685 | | | |
| 22 | 317.29896 | 2.463 | 1.51680 | 64.20 | 0.53430 |
| 23 | −40.37450 | 0.758 | | | |
| 24 | 14.97223 | 1.467 | 1.83481 | 42.72 | 0.56514 |
| 25 | 12.75900 | 20.000 | | | |
| 26 | ∞ | 1.500 | 1.51680 | 64.20 | 0.53430 |
| 27 | ∞ | 18.794 | | | |

TABLE 22

Example 11

| | WIDE | MIDDLE | TELE |
|---|---|---|---|
| Zr | 1.0 | 6.3 | 57.6 |
| f | 12.755 | 80.549 | 735.335 |
| FNo. | 3.89 | 4.65 | 7.51 |
| 2ω(°) | 41.0 | 6.6 | 0.8 |
| DD[7] | 3.353 | 90.765 | 124.753 |
| DD[13] | 197.320 | 90.588 | 4.009 |
| DD[18] | 2.690 | 22.011 | 74.601 |

Table 23 shows values corresponding to the conditional expressions (1) to (7) of the zoom lenses of Examples 1 to 11. Values shown in Table 23 except the values corresponding to conditional expression (2) are based on the d-line.

TABLE 23

| EXPRESSION NUMBER | | EXAMPLE 1 | EXAMPLE 2 | EXAMPLE 3 | EXAMPLE 4 | EXAMPLE 5 |
|---|---|---|---|---|---|---|
| (1) | f1a/f1b | −0.442 | −0.402 | −0.414 | −0.426 | −0.462 |
| (2) | θgF2 − θgF1 | 0.00741 | 0.00318 | 0.00741 | 0.00741 | 0.00741 |
| (3) | vd2 − vd1 | 11.30 | 17.34 | 11.30 | 11.30 | 11.30 |
| (4) | fT/f1 | 3.284 | 3.676 | 3.445 | 3.548 | 3.453 |
| (5) | fT/f2 | −27.886 | −28.512 | −27.500 | −28.512 | −27.716 |
| (6) | fT/f3 | 15.180 | 13.580 | 13.721 | 13.659 | 15.096 |
| (7) | fT/f4 | −3.597 | −1.914 | −4.114 | −2.110 | −4.255 |

| EXPRESSION NUMBER | | EXAMPLE 6 | EXAMPLE 7 | EXAMPLE 8 | EXAMPLE 9 | EXAMPLE 10 | EXAMPLE 11 |
|---|---|---|---|---|---|---|---|
| (1) | f1a/f1b | −0.466 | −0.440 | −0.482 | −0.501 | −0.520 | −0.377 |
| (2) | θgF2 − θgF1 | 0.00318 | 0.00426 | 0.00318 | 0.00318 | 0.00318 | −0.00589 |
| (3) | vd2 − vd1 | 17.34 | 24.70 | 17.34 | 17.34 | 17.34 | 29.50 |
| (4) | fT/f1 | 3.691 | 3.461 | 3.407 | 3.643 | 3.133 | 3.725 |
| (5) | fT/f2 | −29.010 | −29.076 | −27.343 | −28.057 | −31.314 | −28.550 |
| (6) | fT/f3 | 13.448 | 14.650 | 13.969 | 12.240 | 18.176 | 13.699 |
| (7) | fT/f4 | −0.260 | −2.093 | −1.747 | −0.642 | −17.139 | 1.622 |

As can be seen from the above-mentioned data, the zoom lenses of Examples 1 to 11 each have a high zoom ratio which is a zoom ratio of 57.6 times. Thereby, aberrations including spherical aberration and longitudinal chromatic aberration at the telephoto end are satisfactorily corrected. As a result, high optical performance is achieved.

Figure 23:
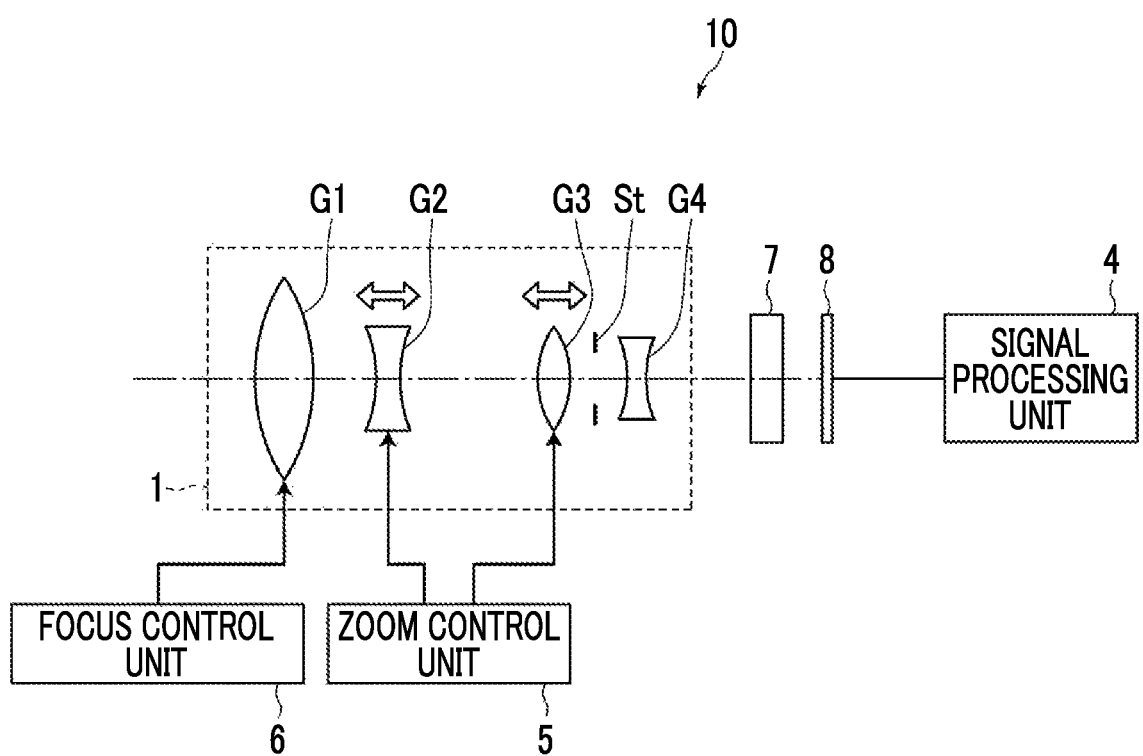
FIG. 23 is a schematic configuration diagram of an imaging apparatus according to an embodiment of the present invention.

Next, an imaging apparatus according to embodiment of the present invention will be described. FIG. 23 is a schematic configuration diagram of an imaging apparatus 10 using the zoom lens 1 according to the embodiment of the present invention as an example of an imaging apparatus of an embodiment of the present invention. As the imaging apparatus 10, for example, there is a surveillance camera, a video camera, an electronic still camera, or the like.

The imaging apparatus 10 comprises a zoom lens 1; a filter 7 that is disposed on the image side of the zoom lens 1; an imaging element 8 that captures an image of a subject formed through the zoom lens; a signal processing unit 4 that calculates an output signal from the imaging element 8; a zoom control unit 5 that is for performing zooming of the zoom lens 1; and a focus control unit 6 that is for focusing of the zoom lens 1. It should be noted that, in FIG. 23, each lens group is schematically illustrated. The imaging element 8 captures the image of the subject formed through the zoom lens 1, converts the image into an electrical signal, and is disposed such that the imaging surface thereof is coplanar with the image plane of the zoom lens 1. As the imaging element 8, for example, it is possible to use a charge coupled device (CCD), a complementary metal oxide semiconductor (CMOS), or the like. It should be noted that FIG. 23 shows only one imaging element 8, but the imaging apparatus of the present invention is not limited to this, and may be a so-called three-plate imaging device having three imaging elements.

The present invention has been hitherto described through embodiments and examples, but the present invention is not limited to the above-mentioned embodiments and examples, and may be modified into various forms. For example, values such as the radius of curvature, the surface spacing, the refractive index, and the Abbe number of each lens component are not limited to the values shown in the numerical examples, and different values may be used therefor.

EXPLANATION OF REFERENCES

1: zoom lens
2w, 2t: on-axis rays
3w, 3t: off-axis rays with maximum angle of view
4: signal processing unit
5: zoom control unit
6: focus control unit
7: filter
8: imaging element
10: imaging apparatus
G1: first lens group
G2: second lens group
G3: third lens group
G4: fourth lens group
G5: fifth lens group
L11: first lens
L12: second lens
L13: third lens
L14: fourth lens
L21 to L24, L31 to L34, and L41 to L45: lens
PP: optical member
Sim: image plane
St: aperture diaphragm
Z: optical axis

What is claimed is:

1. A zoom lens consisting of, in order from an object side:
   a first lens group that has a positive refractive power;
   a second lens group that has a negative refractive power;
   a third lens group that has a positive refractive power;
   a diaphragm; and
   a fourth lens group,
   wherein during zooming, the first lens group and the fourth lens group remain stationary with respect to an image plane, and the second lens group and the third lens group move so as to have a different relative spacing therebetween in an optical axis direction,
   wherein the first lens group consists of, in order from the object side, a cemented lens that is formed by cementing a first lens, which has a negative refractive power and has a meniscus shape convex toward the object side, and a second lens which has a positive refractive power, a third lens that has a positive refractive power, and a fourth lens that has a negative refractive power,
   wherein the following conditional expression (1) is satisfied, $$-0.8 < f1a/f1b < 0 \quad (1),$$

where f1a is a composite focal length of the first lens, the second lens, and the third lens, and
   f1b is a focal length of the fourth lens, and
   wherein lens spacing in the fourth lens group does not change during zooming.

2. The zoom lens according to claim 1, wherein the following conditional expression (2) is satisfied, $$-0.01 < \theta gF2 - \theta gF1 < 0.015 \quad (2),$$

where $\theta gF1$ is a partial dispersion ratio of the first lens between the g line and the F line, and
   $\theta gF2$ is a partial dispersion ratio of the second lens between the g line and the F line.

3. The zoom lens according to claim 1, wherein the following conditional expression (3) is satisfied, $$5 < vd2 - vd1 < 40 \quad (3),$$

where vd1 is an Abbe number of the first lens on the basis of a d-line, and
   vd2 is an Abbe number of the second lens on the basis of the d-line.

4. The zoom lens according to claim 2, wherein the following conditional expression (3) is satisfied, $$5 < vd2 - vd1 < 40 \quad (3),$$

where vd1 is an Abbe number of the first lens on the basis of a d-line, and
   vd2 is an Abbe number of the second lens on the basis of the d-line.

5. The zoom lens according to claim 1, wherein during zooming from a wide-angle end to a telephoto end, a spacing between the third lens group and the fourth lens group constantly increases, and the second lens group and the third lens group simultaneously pass through a point at which respective lateral magnifications thereof are −1 times.

6. The zoom lens according to claim 1, wherein the following conditional expression (4) is satisfied, $$2.5 < fT/f1 < 4.5 \quad (4),$$

where fT is a focal length of the whole system at the telephoto end, and
   f1 is a focal length of the first lens group.

7. The zoom lens according to claim 1, wherein the following conditional expression (5) is satisfied, $$-50<fT/f2<-10 \qquad (5),$$

where fT is a focal length of the whole system at the telephoto end, and
f2 is a focal length of the second lens group.

8. The zoom lens according to claim 1, wherein the following conditional expression (6) is satisfied, $$5<fT/f3<30 \qquad (6),$$

where fT is a focal length of the whole system at the telephoto end, and
f3 is a focal length of the third lens group.

9. The zoom lens according to claim 1, wherein the following conditional expression (7) is satisfied, $$-15<fT/f4<3 \qquad (7),$$

where fT is a focal length of the whole system at the telephoto end, and
f4 is a focal length of the fourth lens group.

10. The zoom lens according to claim 1, wherein the fourth lens group has a negative refractive power.

11. The zoom lens according to claim 1, wherein the fourth lens group has a positive refractive power.

12. The zoom lens according to claim 1, wherein focusing is performed by moving the entire first lens group.

13. The zoom lens according to claim 1, wherein the following conditional expression (1-1) is satisfied $$-0.7<f1a/f1b<-0.2 \qquad (1-1)$$

14. The zoom lens according to claim 1, wherein the following conditional expression (2-1) is satisfied, $$-0.008<\theta gF2-\theta gF1<0.01 \qquad (2-1),$$

where θgF1 is a partial dispersion ratio of the first lens between the g line and the F line, and
θgF2 is a partial dispersion ratio of the second lens between the g line and the F line.

15. The zoom lens according to claim 1, wherein the following conditional expression (3-1) is satisfied, $$7<vd2-vd1<35 \qquad (3-1),$$

where vd1 is an Abbe number of the first lens on the basis of the d-line, and
vd2 is an Abbe number of the second lens on the basis of the d-line.

16. The zoom lens according to claim 1, wherein the following conditional expression (4-1) is satisfied, $$2.8<fT/f1<4 \qquad (4-1),$$

where fT is a focal length of the whole system at the telephoto end, and
f1 is a focal length of the first lens group.

17. The zoom lens according to claim 1, wherein the following conditional expression (5-1) is satisfied, $$-40<fT/f2<-20 \qquad (5-1),$$

where fT is a focal length of the whole system at the telephoto end, and
f2 is a focal length of the second lens group.

18. The zoom lens according to claim 1, wherein the following conditional expression (6-1) is satisfied, $$7<fT/f3<25 \qquad (6-1),$$

where fT is a focal length of the whole system at the telephoto end, and
f3 is a focal length of the third lens group.

19. The zoom lens according to claim 1, wherein the following conditional expression (7-1) is satisfied, $$-12<fT/f4<2 \qquad (7-1),$$

where fT is a focal length of the whole system at the telephoto end, and
f4 is a focal length of the fourth lens group.

20. An imaging apparatus comprising the zoom lens according to claim 1.

* * * * *